US007188888B2

(12) United States Patent
Wheatley et al.

(10) Patent No.: US 7,188,888 B2
(45) Date of Patent: Mar. 13, 2007

(54) TONNEAU SYSTEM LATCH

(76) Inventors: Donald G. Wheatley, 4451 Ford Rd., Ann Arbor, MI (US) 48105; David M. Daley, 433 Riley St., Dundee, MI (US) 48131

( * ) Notice: Subject to any disclaimer, the term of this patent is extended or adjusted under 35 U.S.C. 154(b) by 98 days.

(21) Appl. No.: 11/140,754

(22) Filed: May 31, 2005

(65) Prior Publication Data

US 2006/0267370 A1  Nov. 30, 2006

(51) Int. Cl.
*B60P 7/02* (2006.01)
(52) U.S. Cl. .................. 296/100.04; 296/100.02; 292/256.73
(58) Field of Classification Search ........... 296/100.02, 296/100.06, 100.04, DIG. 43; 292/256.73
See application file for complete search history.

(56) References Cited

U.S. PATENT DOCUMENTS

| 2,465,621 | A |   | 3/1949  | Wheeler         |            |
|-----------|---|---|---------|-----------------|------------|
| 3,146,824 | A |   | 9/1964  | Veilleux        |            |
| 3,201,171 | A |   | 8/1965  | Wickard         |            |
| 3,572,821 | A | * | 3/1971  | Van Antwerp     | 296/100.02 |
| 4,033,268 | A |   | 7/1977  | Klekar          |            |
| 4,036,521 | A |   | 7/1977  | Clenet          |            |
| 4,272,119 | A |   | 6/1981  | Adams           |            |
| 4,563,034 | A |   | 1/1986  | Lamb            |            |
| 4,730,866 | A |   | 3/1988  | Nett            |            |
| 4,757,854 | A |   | 7/1988  | Rippberger      |            |
| 4,838,602 | A |   | 6/1989  | Nett            |            |
| 5,076,338 | A |   | 12/1991 | Schmeichel et al. |          |
| 5,174,353 | A |   | 12/1992 | Schmeichel et al. |          |
| 5,251,951 | A |   | 10/1993 | Wheatley        |            |
| 5,302,064 | A |   | 4/1994  | Davis           |            |
| 5,322,336 | A |   | 6/1994  | Isler           |            |
| 5,445,482 | A |   | 8/1995  | Davis           |            |
| 5,462,249 | A | * | 10/1995 | Calzone         | 292/256.73 |
| 5,516,245 | A |   | 5/1996  | Cassidy         |            |
| 5,636,893 | A | * | 6/1997  | Wheatley et al. | 296/100.07 |
| 5,752,791 | A |   | 5/1998  | Ehrlich         |            |
| 5,906,407 | A |   | 5/1999  | Schmeichel      |            |
| 5,934,849 | A |   | 8/1999  | Haire           |            |

(Continued)

OTHER PUBLICATIONS

Owner's Manual; Truxedo® 2001; The Classy Cover for your Pickup Box; Genuine Shur-Co, Jul. 16, 2001; also at http://www.truxedo.com, 8 pages.

(Continued)

*Primary Examiner*—Lori L. Coletta
(74) *Attorney, Agent, or Firm*—Harness, Dickey & Pierce, P.L.C.

(57) ABSTRACT

A tonneau system for a cargo box of a pickup truck having a framework. The framework having a cross bow member for supporting a cover and being positionable generally over the cargo box of the pickup truck. The tonneau system further includes a latch assembly pivotally coupled to the cross bow member. The latch assembly is positionable in a latched position engagable with the cargo box of the pickup truck, an unlatched position disengagable with the cargo box of the pickup truck, and a nested position substantially retracted from the unlatched position and received within the cross bow member. The tonneau system may further include a biasing member that is substantially received within a portion of the latch assembly to improve consistent spring rates across the actuation range.

28 Claims, 30 Drawing Sheets

U.S. PATENT DOCUMENTS

| | | | |
|---|---|---|---|
| 6,024,402 | A | 2/2000 | Wheatley |
| 6,068,433 | A | 5/2000 | Baloga |
| 6,106,205 | A | 8/2000 | Haire |
| 6,146,069 | A | 11/2000 | Elwell et al. |
| 6,244,646 | B1 | 6/2001 | Wheeler, III |
| 6,256,844 | B1 | 7/2001 | Wheatley |
| 6,293,608 | B1 | 9/2001 | Dicke et al. |
| 6,350,089 | B1 | 2/2002 | Tekavec |
| 6,575,520 | B1 | 6/2003 | Spencer |

OTHER PUBLICATIONS

McMaster-Carr Catalog; Cargo Tie Down Track & Stabilizing Bars; 1 page.

Kinedyne; Interior Van—Logistic Track; at http://www.kinedyne.com/interiorvan/logistic-track.asp; 1 page; Jun. 2002.

Kinedyne; Interior Van—Logistic Straps; at http://www.kinedyne.com/interiorvan/logistic-straps.asp; 1 page; Jun. 2002.

Automega—The RollerBox System Catalog; The RollerBox Tool Box System; also at http://www.customautotrim.com/products/toolbox/catalog.htm; 3 pages; Jun. 2002.

Mac's Custom Tie-Down Kits; Complete Truck Kits and Anchor Plate Kits for Your Pickup Truck; at http://www.macscustomtiedowns.com/bolton.htm; 2 pages; Jun. 2002.

Pickup Specialties; Truck Bed Slide Out Platform; at http://www.pickupspecialties.com/bedslide/htm; 3 pages; Jun. 2002.

AZ Trucks.com; HighlandGroup Industries; Ramp Champ; at http://www.aztrucks.com/Category.asp?product=115; 2 pages; Jun. 2002.

AZ Trucks.com; Buddy Bar; at http://www.aztrucks.com/Category.asp?product=74; 1 page; Jun. 2002.

AZ Trucks.com; Hi-Lift; Slide-N-Lock; at http://www.aztrucks.com/Category.asp?product=152; 2 pages; Jun. 2002.

SlideSystems™; Truck Accessories; at http://www.slidesystems.com/; 1 page; Jun. 2002.

ReadyRamp by Cordesign; at http://www.readyramp.com/; 1 page; Jun. 2002.

FrioDesigns; Pickup Trunk™; at http://www.friodesigns.com/; 1 page; Jun. 2002.

Bully Clamp; The Tie-Down System for Pick-up Trucks of the Millenium; at http://www.bullyclamp.com/; 1 page; Jun. 2002.

IFW; Bedslide; at http://www.bedslide.com/; 1 page; Jun. 2002.

* cited by examiner

TONNEAU SYSTEM LATCH

FIELD OF THE INVENTION

The present invention generally relates to coverings for pickup trucks and, more particularly, relates to a latch for use with a foldable tonneau cover system.

BACKGROUND OF THE INVENTION

Tonneau covers have been used for a number of years to cover the cargo box of pickup trucks against dirt, debris, and other environmental contaminants and to improve the aesthetic quality thereof. Originally, tonneau covers were designed by upholstery shops and typically made of vinyl covered fabrics or canvas. The material was often doubled over along its edges for added strength and appearance. Male snaps were then attached to the sides of the cargo box of the pickup truck via fasteners, while female snaps were attached along the edges of the cover. Wooden bows were sometimes used to span the cargo box and ensure that the cover remained high enough to drain water. Unfortunately, these covers were sometimes difficult to handle and/or manufacture, and occasionally failed to protect the cargo box.

More recently, foldable tonneau covers are often more desirable in that the conveniently cover the bed of the pickup truck for cargo protection. However, when not in use, the foldable tonneau cover may be folded toward the rear of the passenger cabin. Generally, foldable tonneau covers include a frame network of cross bows, a tarp or covering operably coupled to and spanning the frame network, a latching system for coupling the frame network to the pickup truck and a means for stowing the latching system, and a hinge system for hingedly coupled adjacent sections of the foldable tonneau cover. However, the known prior art fails to maximize the ease and effectiveness of foldable tonneau covers and, thus, many foldable tonneau covers suffer from numerous disadvantages.

By way of example, existing latching systems generally employ an over center cam lock arrangement to fasten the tonneau cover in place relative to the pickup truck. The cam lock hooks onto the downwardly projecting flange of the truck bed. This cam lock is adjustable by rotating a threaded cam pivot to permit attachment of the latching system to pickup trucks with differing length downwardly projecting flanges. However, this adjustment mechanism leads to various problems or failures by users. For instance, if the user adjusts the cam lock too tight, the cam lock may break or fracture the plastic bow(s) in the frame network of the tonneau cover. It should be readily appreciated that such a failure may lead to the tonneau cover becoming loose and blowing off from the vehicle. Alternatively, the cam lock may be fastened loosely, which again may lead to the tonneau cover becoming loose and blowing off. Still further, it is possible that the cam lock may be inadvertently pushed back over center by movement of cargo or the like, which again may lead to the tonneau cover becoming loose. Finally, conventional cam locks and/or clamps often require the clamp to be manipulated to properly align with the truck bed.

When conventional foldable tonneau covers are stowed, that is when the tonneau cover is folded and positioned generally adjacent the passenger cabin, it is important to ensure that any clamps or latching members are properly stowed to prevent puncture of the cover material. To this end, presently conventional latch systems must be rotated, folded up, clipped to the side and rotated, and then folded flat for no puncture stowage. As should be readily appreciated, this is a complex procedure that often leads to inadvertent damage to the tonneau cover.

Similarly, conventional foldable tonneau covers often employ an attachment that slides within a receiving groove to retain the tarp or covering to the frame network or bows. Although this technique serves to generally prevent the tarp or covering from becoming disengaged from the frame network, assembly of such is often burdensome due to the sliding nature of the attachment. In fact, these sliding attachments often require the complete disassembly of the tonneau cover to repair the tarp or covering. Additionally, due to the need to gain access to the ends of the frame network or bows to receive the sliding attachment member, alternative assembly sequences are limited.

Furthermore, it is obvious that in order for a foldable tonneau cover to fold, a hinge system must be provided. However, conventional hinge systems suffer from many disadvantages. For example, when using a single pivot hinge, the tarp or covering may be pinched near the bend area. This may lead to failure, in the form of a tear or rip, of the tarp or covering, thereby exposing the contents of the cargo box to the environment. Accordingly, there exists a need in the relevant art to overcome the disadvantages of the prior art.

SUMMARY OF THE INVENTION

According to the principles of the present invention, a tonneau system for a cargo box of a pickup truck is provided having advantageous construction. The tonneau system includes a framework having a cross bow member for supporting a cover. The framework being positionable generally over the cargo box of the pickup truck. The tonneau system further includes a latch assembly pivotally coupled to the cross bow member. The latch assembly is positionable in a latched position engagable with the cargo box of the pickup truck, an unlatched position disengagable with the cargo box of the pickup truck, and a nested position substantially retracted from the unlatched position and received within the cross bow member. The tonneau system may further include a biasing member that is substantially received within a portion of the latch assembly to improve consistent spring rates across the actuation range.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
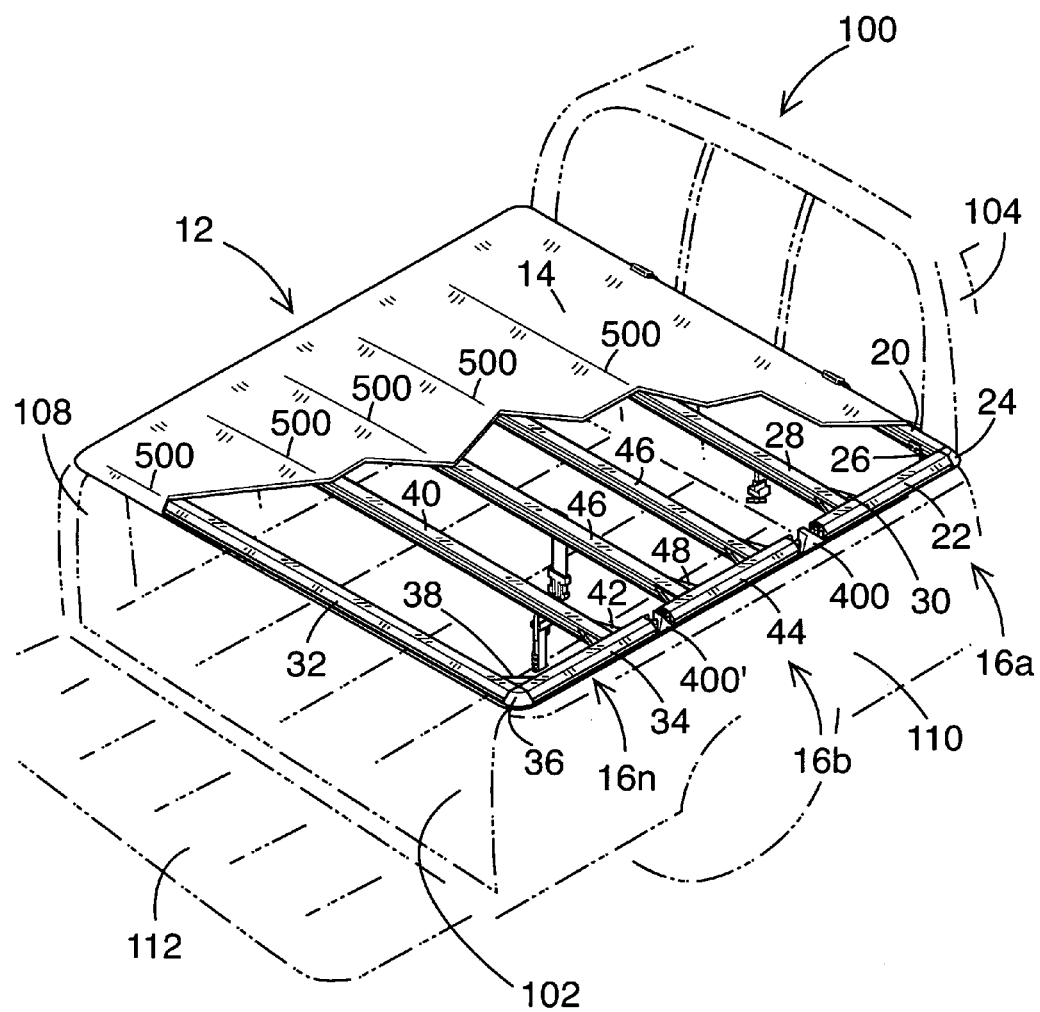
FIG. 1 is a perspective view illustrating a foldable tonneau cover according to the principles of the present invention positioned upon a cargo box of a pickup truck.

With reference to FIG. 1, a pickup truck 100 is shown having a foldable tonneau system 12 for use with pickup truck 100. Pickup truck 100 generally includes a cargo box 102 and a passenger cabin 104. Cargo box 102 includes a front wall (not shown), a left sidewall 108, a right sidewall 110, and a rear wall or tailgate 112. It should be understood that right sidewall 110 and left sidewall 108 of pickup truck 100 are identical, yet arranged in mirrored symmetry. Accordingly, in the interest of brevity, only one side will be discussed in detail below in connection with foldable tonneau system 12 unless noted otherwise Still referring to FIG. 1, foldable tonneau system 12 includes a flexible, stretchable fabric cover 14 that is drawn tightly over a plurality of tonneau sections 16. It should be understood that the principles of the present invention are equally applicable to foldable tonneau systems having two, three, or more sections, each foldable relative to adjacent sections. However, for purposes of this disclosure, a foldable tonneau system having three tonneau sections 16a, 16b, and 16n will be described. This configuration should not be regarded as limiting the claims herein. Tonneau sections 16a–16n may be referred to herein as front tonneau section 16a, middle tonneau section 16b, and rear tonneau section 16n.

Each of the plurality of tonneau sections 16a–16n includes an internal framework of support members that are attached to one another to form a rectangular frame. Specifically, front tonneau section 16a includes a front rail member 20 fixedly coupled to a pair of side members 22 via a corner insert 24. Corner insert 24 is preferably rounded along an exterior surface to prevent stress concentrations in fabric cover 14. Corner insert 24 includes a pair of male portions (not shown) sized to be fixedly received and engaged within front rail member 20 and the pair of side members 22. A corner brace 26 is fixedly coupled, via conventional threaded fasteners, between front rail member 20 and each side member 22 to provide improved structural integrity. Front tonneau section 16a further includes a cross bow member 28 being generally parallel to front rail member 20 and spaced apart therefrom. Cross bow member 28 is generally C-shaped in cross section and is fixedly coupled to the pair of side members 22 via a corner brace 30 disposed on opposing ends thereof. It should be understood that additional or alternative connection features may be employed to couple cross bow member 28 to the pair of side members 22. The pair of side members 22 is adapted to rest upon a top surface of sidewalls 108 and 110.

Similarly, rear tonneau section 16n includes a rear rail member 32 fixedly coupled to a pair of side members 34 via a corner insert 36. Corner insert 36 is preferably rounded along an exterior surface to prevent stress concentrations in fabric cover 14. Corner insert 36 includes a pair of male portions (not shown) sized to be fixedly received and engaged within rear rail member 32 and the pair of side members 34. A corner brace 38 is fixedly coupled, via conventional threaded fasteners, between rear rail member 32 and each side member 34 to provide improved structural integrity. Rear tonneau section 16n further includes a cross bow member 40 being generally parallel to rear rail member 32 and spaced apart therefrom. For manufacturing simplicity, cross bow member 40 can be identical to cross bow member 28 in cross section and side members 34 can be similar to, but vary in length relative to, side member 22. However, it should be appreciated that this is not required.

Cross bow member 40 is fixedly coupled to the pair of side members 34 via a corner brace 42 disposed on opposing ends thereof. Again, it should be understood that additional or alternative connection features may be employed to couple cross bow member 40 to the pair of side members 34. The pair of side members 34 is adapted to rest upon a top surface of sidewalls 108 and 110.

Figure 29:
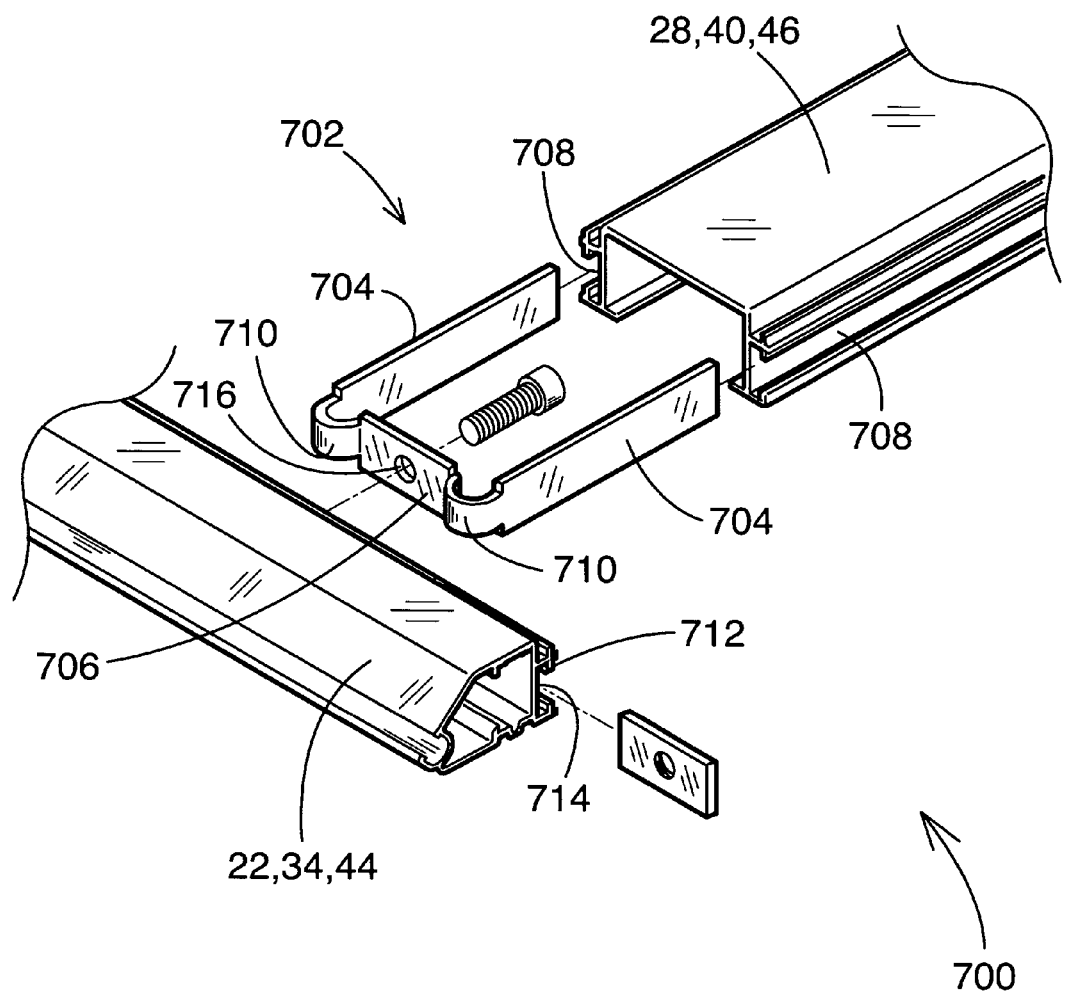
FIG. 29 is a perspective view illustrating an attachment mechanism.
Figure 30:
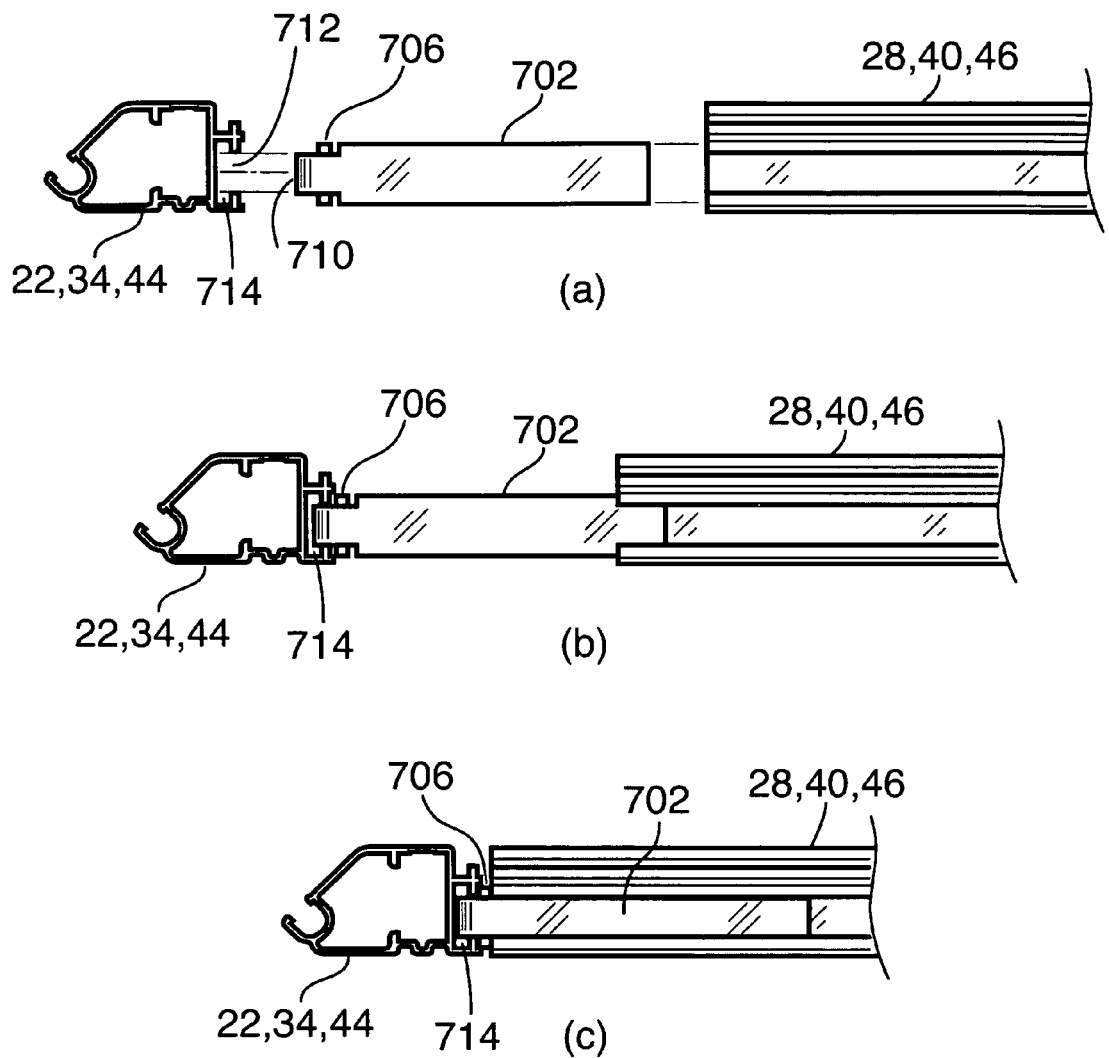
FIGS. 30(a)–(c) are progressive side views illustrating assembly of the attachment mechanism.

As seen in FIGS. 29–30(c), it should be understood that cross bow members 28, 40, and 46 can be coupled to side members 22, 34, and 44, respectively, via attachment mechanism 700. Attachment mechanism 700 can include a U-shaped bracket member 702. U-shaped bracket member 702 can include a pair of generally parallel legs 704 extending from a base portion 706. The pair of generally parallel legs 704 can each be sized in width and thickness to be slidable received and captured within outboard slots 708 formed in cross bow member 28, 40, and 46. Outboard slots 708 can be formed separate from upturned slots 314. Such arrangement permits free movement of rear latch assembly 300 without interference with attachment mechanism 700.

Still referring to FIGS. 29–30(c), base portion 706 of U-shaped bracket member 702 can further include one or more anti-rotation features 710 preferably formed at opposing ends of base portion 706. Anti-rotation features 710 can include a reduced width to permit such anti-rotation features 710 to be received within a gap 712 of a slot 714 formed in side members 22, 34, and 44. When anti-rotation features 710 are received in gap 712, twisting motion of U-shaped bracket member 702 relative to side members 22, 34, and 44 is minimized, thus minimizing twisting motion of cross bow members 28, 40, and 46.

Base portion 706 of U-shaped bracket member 702 further includes an aperture 716 sized to receive a fastener 718 therethrough. Fastener 718 can threadedly engage a sliding washer member 720 slidably received within slot 714. Sliding washer member 720 is sized to permit sliding movement along slot 714, yet resist removal therefrom in a direction orthogonal to such sliding movement. During installation, fastener 718 can be fastened to sliding washer member 720 within slot 714 to frictionally retain U-shaped bracket member 702 relative to side member 22, 34, and 44.

It should be appreciated that this arrangement permits simple coupling of cross bow members 28, 40, and 46 relative to side members 24, 34, and 44 with a single fastener to simplify manufacturing and assembly. Additionally, such arrangement further permits movement, albeit limited, of cross bow member 28, 40, and 46 relative to side members 22, 34, and 44, which can reduce material stress in fabric cover 14.

Middle tonneau section 16b includes a pair of side members 44 and a pair of generally parallel cross bow members 46. Cross bow members 46 can be identical to cross bow members 28 and 40 and side members 44 can be similar to, but vary in length relative to, side members 22 and 34. However, again it should be appreciated that this is not required. Cross bow members 46 are each further fixedly coupled to the pair of side members 44 via corner braces 48 disposed on opposing ends thereof. The pair of side members 44 is adapted to rest upon a top surface of sidewalls 108 and 110.

Figure 2:
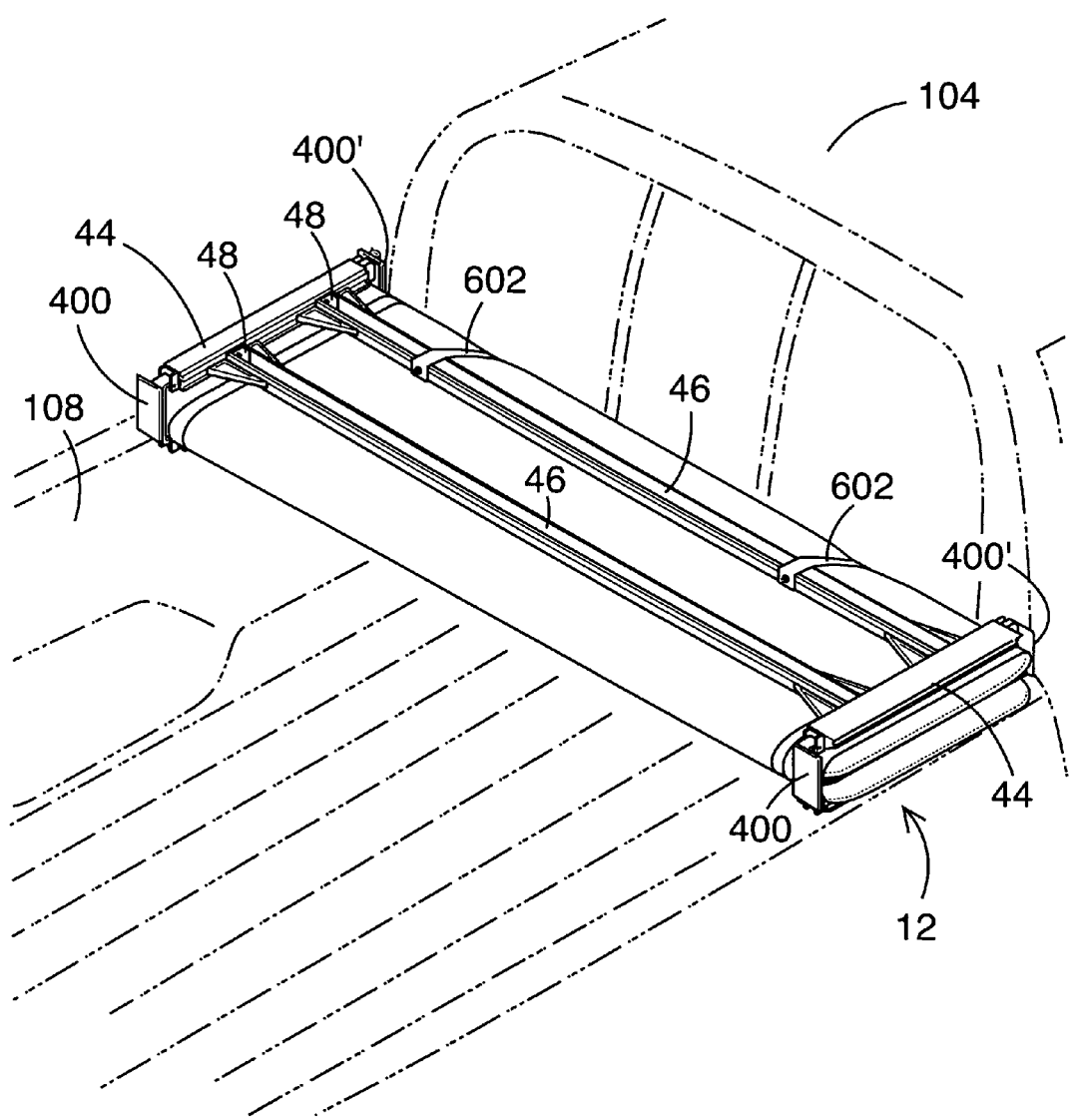
FIG. 2 is a perspective view illustrating the foldable tonneau cover in a folded position.

Still referring to FIG. 1, foldable tonneau system 12 further includes a first pair of dual linkage hinge assemblies 400 and a second pair of dual linkage hinge assemblies 400'. The first pair of dual linkage hinge assemblies 400 is sized to pivotally interconnect side members 22 of front tonneau section 16a to side members 44 of middle tonneau section 16b. Similarly, the second pair of dual linkage hinge assemblies 400' is sized to pivotally interconnect side members 34 of rear tonneau section 16n to side members 44 of middle tonneau section 16b. The second pair of dual linkage hinge assemblies 400' are preferably shorter than the first pair of dual linkage hinge assemblies 400 to provide the necessary spacing to permit folding of rear tonneau section 16n onto middle tonneau section 16b and the combination rear and middle tonneau section bundle onto front tonneau section 16a, as seen in FIG. 2. Dual linkage hinge assemblies 400 and 400' will be described in detail below.

Front Latch Assembly

Figure 4:
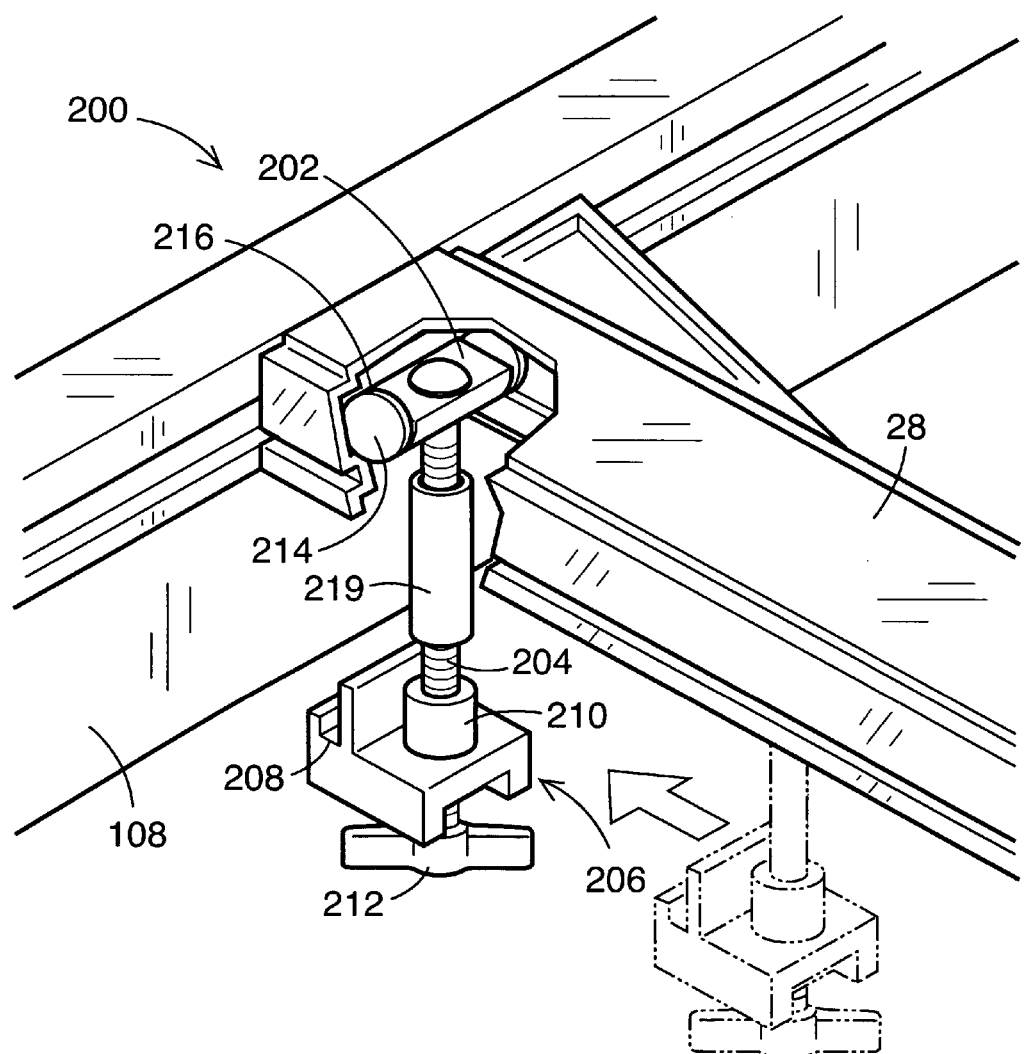
FIG. 4 is an enlarged perspective view illustrating the forward clamping system of the front tonneau section of the present invention.

As best seen in FIG. 4, front tonneau section 16a is fixedly coupled to sidewall 108 of cargo box 100 via a front latch assembly 200. Front latch assembly 200 includes a front trunnion 202 that is sized to be received within front cross bow member 28. Front trunnion 202 is captured within the C-shaped cross section of cross bow member 28 as similarly illustrated in FIG. 11. As will be discussed below, front trunnion 202 includes the pair of trunnion ends 214 are adapted to slide along C-shaped cross bow member 28 during installation and stowage. More preferably, the pair of trunnion ends 214 is configured to include a flanged end that defines a wheel 216. As similarly configured as the rear latch assembly illustrated in FIG. 12, wheels 216 are captured and retained within upturned slots (identical to upturned slots 314 of FIG. 12) formed in cross bow member 28.

Front latch assembly 200 further includes a downwardly extending threaded member 204. Threaded member 204 may be a bolt extending through an aperture formed in front trunnion 202 or may be integrally formed with front trunnion 202 as a single member. A slidable catch 206, having an engaging portion 208 and an aperture 210, is slidably received on threaded member 204 such that threaded member 204 extends through aperture 210. A corresponding fastener 212 is threadedly engaged with threaded member 204 to retain slidable catch 206. As seen in phantom in FIG. 4, front latch assembly 200 may be slid along front cross bow member 28 to position slidable catch 206 adjacent sidewall 108. Corresponding fastener 212 is then actuated to draw slidable catch 206 upwardly until engaging portion 208 engages sidewall 108. Engaging portion 208 is illustrated as being generally U-shaped to provide positive and reliable capture of sidewall 108. Upon further actuation of corresponding fastener 212, a compression force is imparted to compress the pair of side members 22 against sidewalls 108 and 110 to retain front tonneau section 16a in a desired position.

In some embodiments, it may be desirable to protect sidewall 108 from contact or abrasion from threaded member 204 positioned adjacent thereto. In this regard, a member 219 may be positioned between threaded member 204 and sidewall 108. Member 219 may be a deformable sleeve member substantially surrounding threaded member 204 to prevent contact of threaded member 204 directly with sidewall 108. It should be understood that during installation, member 219 does not impede the upward movement of slidable catch 206.

Rear Latch Assembly

Figure 11:
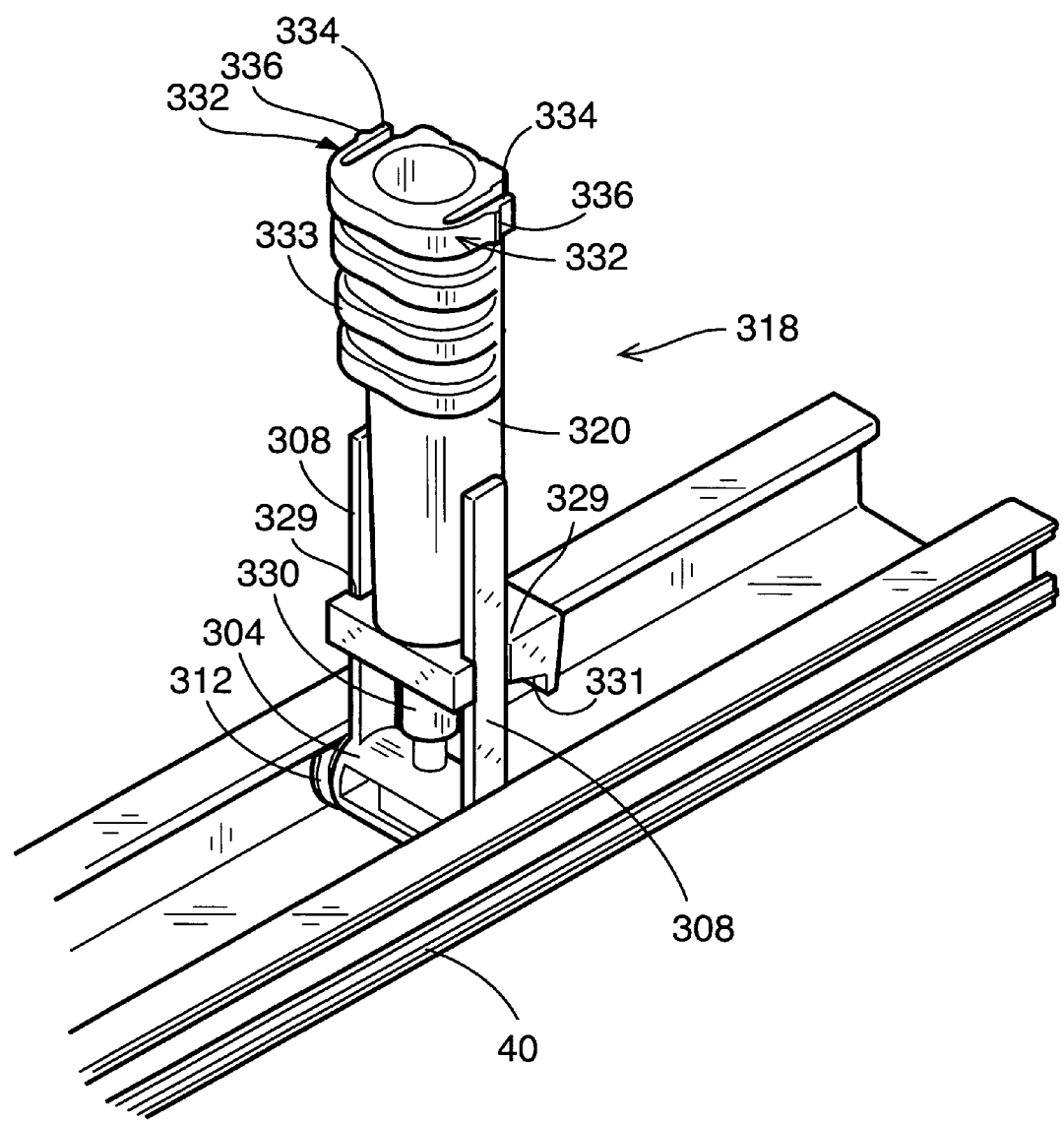
FIG. 11 is an enlarged perspective view illustrating the rear clamping system of the rear tonneau section.
Figure 12:
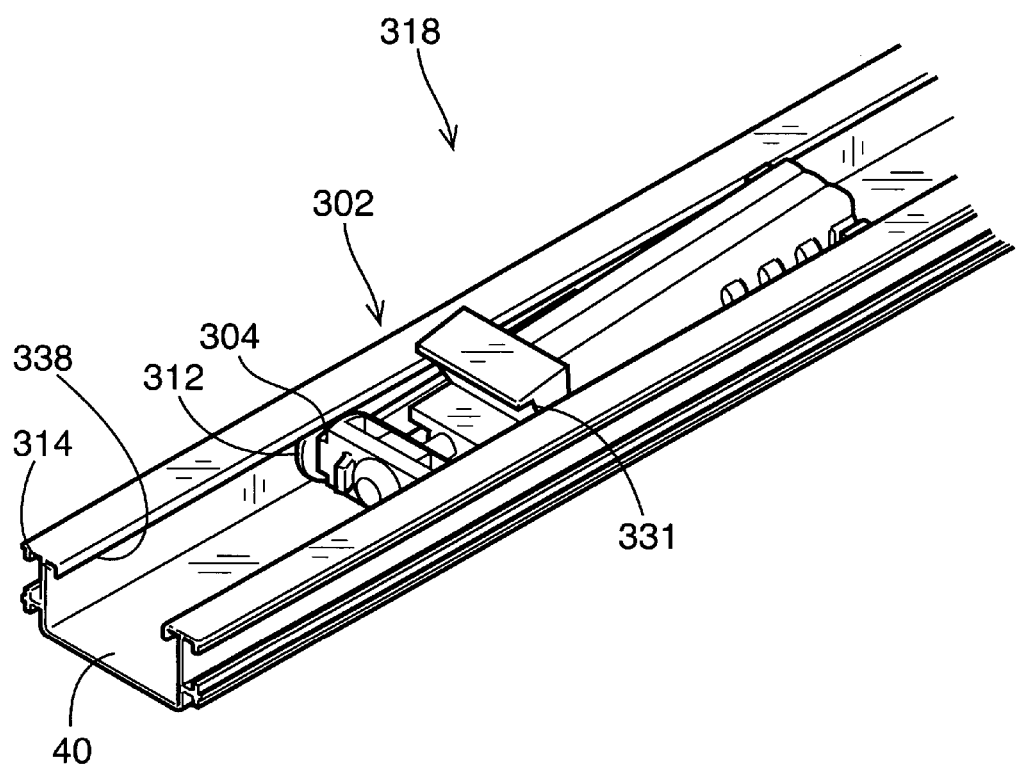
FIG. 12 is an enlarged perspective view illustrating the rear clamping system of the rear tonneau section being moved from an extended to the nested position within a cross bow member.
Figure 13:
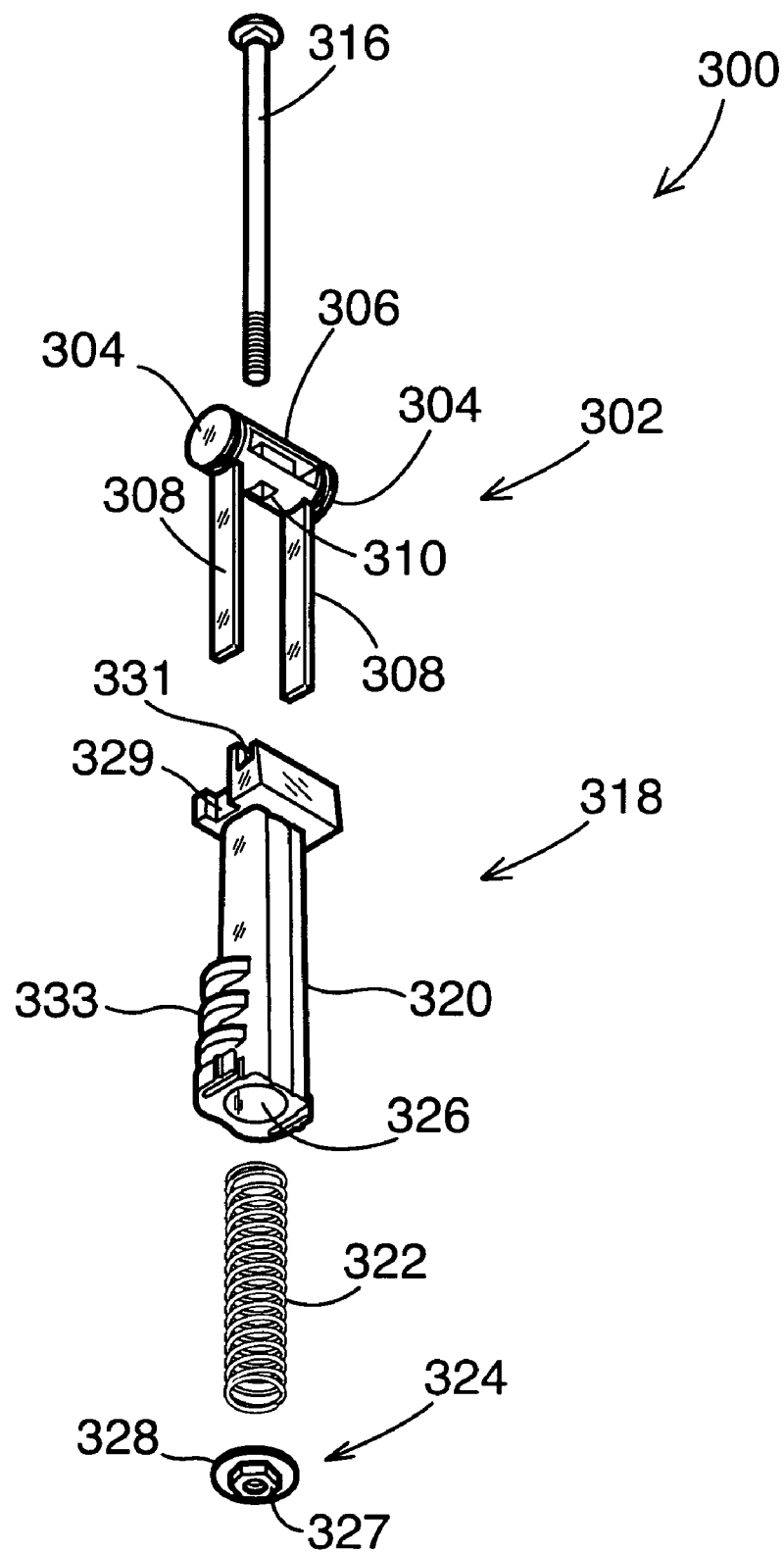
FIG. 13 is an exploded perspective view illustrating the rear clamping system of the rear tonneau section.

Turning now to FIGS. 6–9 and 11–13, rear tonneau section 16n is fixedly coupled to sidewall 108 of cargo box 100 via a rear latch assembly 300. As best seen in FIG. 13, rear latch assembly 300 includes a rear trunnion assembly 302 that is sized to be received within rear cross bow member 40. Specifically, rear trunnion assembly 302 includes a pair of trunnion ends 304 extending from a trunnion main body 306 and a pair of parallel slide members 308. The pair of parallel slide members 308 each extends orthogonally from trunnion main body 306. Rear trunnion assembly 302 further includes an aperture 310 extending through trunnion main body 306. A longitudinal axis of aperture 310 is generally parallel to the pair of parallel slide members 308.

As seen in FIGS. 11 and 12, the pair of trunnion ends 304 is sized to be slidably captured within the C-shaped cross section of cross bow member 40. The pair of trunnion ends 304 is adapted to slide along C-shaped cross bow member 40 during installation and stowage. More preferably, the pair of trunnion ends 304 is configured to include a flanged end that defines a wheel 312. As seen in FIG. 12, wheel 312 is captured and retained within upturned slots 314 formed in cross bow member 40.

Referring again to FIG. 13, rear latch assembly 300 further includes a downwardly extending threaded member 316 received within aperture 310 of trunnion main body 306. In the present embodiment, threaded member 316 is a carriage bolt. It should be understood, however, that threaded member 316 may be integrally formed with trunnion main body 306 as a single member.

59 A slidable handle assembly 318 is slidably coupled to trunnion main body 306 and threaded member 316. Specifically, slidable handle assembly 318 includes a handle portion 320, a biasing member 322, and a retaining nut 324. Handle portion 320 includes a central bore 326 extending partly through handle portion 320. Central bore 326 is sized to receive biasing member 322 therein such that an end of biasing member 322 engages a surface within handle portion 320 to resist movement of biasing member 322 during compression. Retaining nut 324 includes a threaded opening 327 and a flange 328 sized to engage an opposing end of biasing member 322 and fit within central bore 326 to exert a compression force upon biasing member 322. Handle portion 320 further includes an aperture (not shown) formed within a shank portion 330 (FIG. 11) that is sized to receive threaded member 316 there through, yet smaller than a diameter of biasing member 322. Accordingly, threaded member 316 extends through shank portion 330 and at least partly through central bore 326. Biasing member 322 is positioned within central bore 326 and about threaded member 316. Biasing member 322 is captured within central bore 326 by retaining nut 324 that threadedly engages threaded member 316 to define an assembled state.

As best seen in FIG. 11, in this assembled state, the pair of parallel slide members 308 is received within a corresponding pair of slots 329 formed in handle portion 320. The pair of slots 329 is sized to permit the pair of slide members 308 to slide in response to relative movement between rear trunnion assembly 302 and handle assembly 318 but constrain relative axial rotation. This lack of axial rotation ensures that slidable handle assembly 318 is properly orientated for attachment to cargo box 102 and also for nesting within cross bow member 40, as will be discussed below.

Turning now to FIGS. 6, 7, and 11–13, slidable handle assembly 318 further includes an integrally formed engaging portion 331. As seen in phantom in FIGS. 6 and 7, rear latch assembly 300 may be slid along rear cross bow member 40 to position slidable handle assembly 318 adjacent sidewall 108. Slidable handle assembly 318 can then be pulled downwardly, against the biasing force of biasing member 322 until engaging portion 331 engages sidewall 108. Engaging portion 331 is illustrated as being generally U-shaped to provide positive and reliable capture of sidewall 108. Handle portion 320 includes a gripping portion 333 to facilitate such gripping operation. Upon release, the biasing force of biasing member 322, acting between the internal wall of central bore 326 and retaining nut 324, imparts a compression force upon the pair of side members 34 and sidewalls 108 and 110 to retain rear tonneau section 16n in a desired position concealing cargo box 102. It has been found that this biasing force of biasing member 322 is sufficient to reliably retain rear tonneau section 16n to cargo box 102. It should be appreciated that this biasing force is adjustable by varying the extension spring size and/or adjusting retaining nut 324 to achieve the desired level of compression. Also, it should be appreciated that biasing member 322 may be an extension spring, an elastomeric member, a bushing, a hydraulic or pneumatic cylinder, a bushing, or any other known system for biasing a member.

Briefly, it should be appreciated that by positioning biasing member 322 within central bore 326 of handle portion 320, a number of advantages are realized. For example, known hook latches often employ a short spring positioned between the latch base and the latch hook/latching point. This dictates a longer bodied latch than is desirable for a tonneau and also dictates a short stroke spring. These short stroke springs have a spring rate that varies quickly. However, with such a wide variety of sidewall flange thicknesses/lengths of today's pickup truck, a short stroke spring would either prevent any attachment whatsoever or would fail to provide enough compression force to reliably retain the tonneau system.

These disadvantages are overcome in the present invention by positioning a longer biasing member 322 within handle portion 320, which protrudes past engaging portion 331 (i.e. the latching point). This long extension spring arrangement provides a more constant spring rate over a longer range of sidewall flange thicknesses/lengths. Additionally, by positioning engaging portion 331 (i.e. the latching point) near the top of rear latch assembly 300, rear latch assembly 300 is able to better accommodate short sidewall flange thicknesses/lengths.

Figure 9:
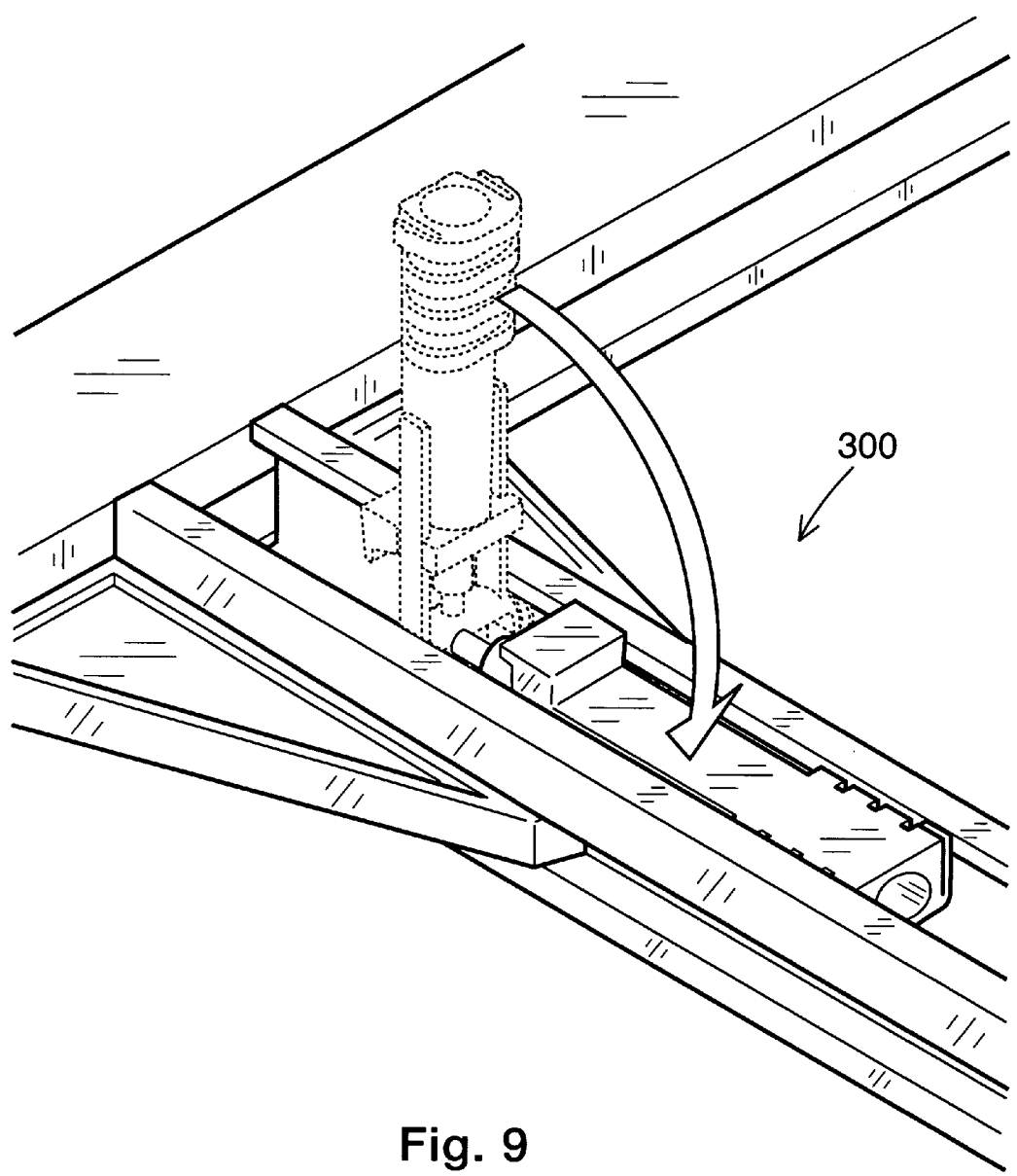
FIG. 9 is an enlarged perspective view illustrating the rear clamping system of the rear tonneau section being moved from an extended to the nested position within a cross bow member.

Additionally, a considerable feature of rear latch assembly 300 is its ability to be stowed substantially within the cross-sectional perimeter of rear cross bow member 40. As best seen in FIGS. 9 and 12, this is a substantial advantage in that by nesting rear latch assembly 300 generally within the confines of rear cross bow member 40, fabric cover 14 of foldable tonneau system 12 is substantially less likely of being damaged by contact with rear latch assembly 300, thereby improving the durability of fabric cover 14. During a nesting operation, rear latch assembly 300 is pivoted from a latching position to a nested position. Specifically, once rear latch assembly 300 is unlatched from sidewalls 108, it may be slid longitudinally inboard from its latching position. Rear latch assembly 300 may then be pivoted about an axis extending through trunnion ends 304 toward rear cross bow member 40 until handle portion 320 is received within a space generally defined by the periphery of rear cross bow member 40.

To retain rear latch assembly 300 in this nested position, handle portion 320 includes a pair of integrally-molded locking clips 332 (FIGS. 11 and 12). The pair of integrally molded locking clips 332 is each molded to define a flexible cantilever portion 334 and a locking feature 336 extending therefrom. Locking clips 332 are operable to flex inwardly as handle portion 320 is pushed within rear cross bow member 40. Specifically, locking feature 336 engages an inwardly turned flange 338, which is part of slot 314 of rear cross bow member 40 (FIG. 12), and causes cantilever portion 334 to flex inwardly until locking feature 336 passes flanges 338. Once cantilever portion 334 passes flange 338 it expands slightly to reliably lock handle portion 320 in the nested position. To remove handle portion 320 from the nested position, the ends of cantilever portions 334 may be collapsed by a user to disengage locking features 336 from flange 338, thereby permitting handle portion 320 to be pivoted into the latching position orthogonal to rear cross bow member 40.

Dual Linkage Hinge Assembly

As discussed above, with reference to FIGS. 1 and 14–25, foldable tonneau system 12 further includes the first pair of dual linkage hinge assemblies 400 and the second pair of dual linkage hinge assemblies 400'. The first pair of dual linkage hinge assemblies 400 is sized to pivotally interconnect side members 22 of front tonneau section 16a to side members 44 of middle tonneau section 16b. Similarly, the second pair of dual linkage hinge assemblies 400' is sized to pivotally interconnect side members 34 of rear tonneau section 16n to side members 44 of middle tonneau section 16b. The second pair of dual linkage hinge assemblies 400' are preferably shorter than the first pair of dual linkage hinge assemblies 400 to provide the necessary spacing to permit folding of rear tonneau section 16n onto middle tonneau section 16b and the combination rear and middle tonneau section bundle onto front tonneau section 16a, as seen in FIG. 2. However, despite this difference in size, the first pair of dual linkage hinge assemblies 400 and the second pair of dual linkage hinge assemblies 400' are identical in construction. Therefore, in the interest of brevity, only one of the dual linkage hinge assemblies 400 will be described in detail.

Figure 14:
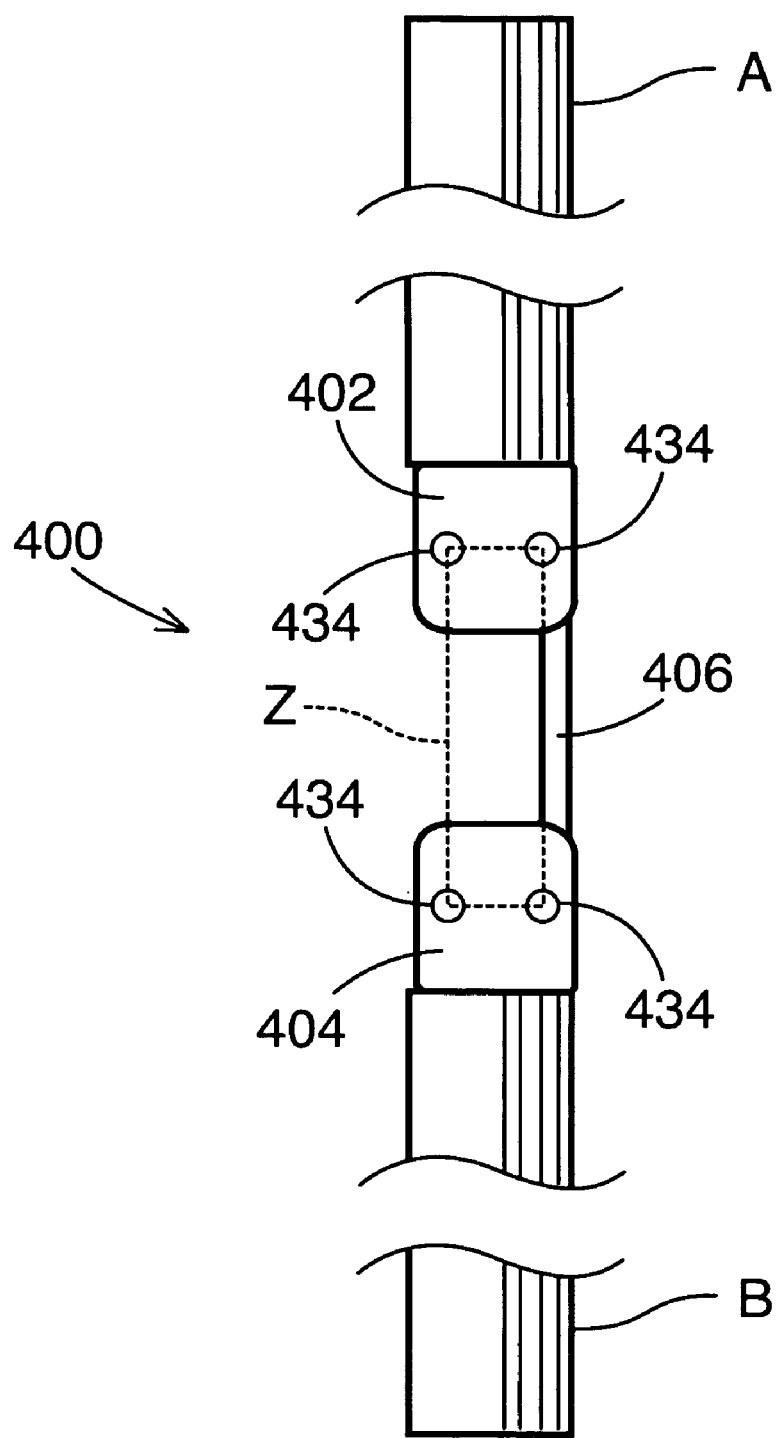
FIG. 14 is a side view illustrating a dual linkage hinge assembly coupled between adjacent tonneau sections in a flat position.
Figure 15:
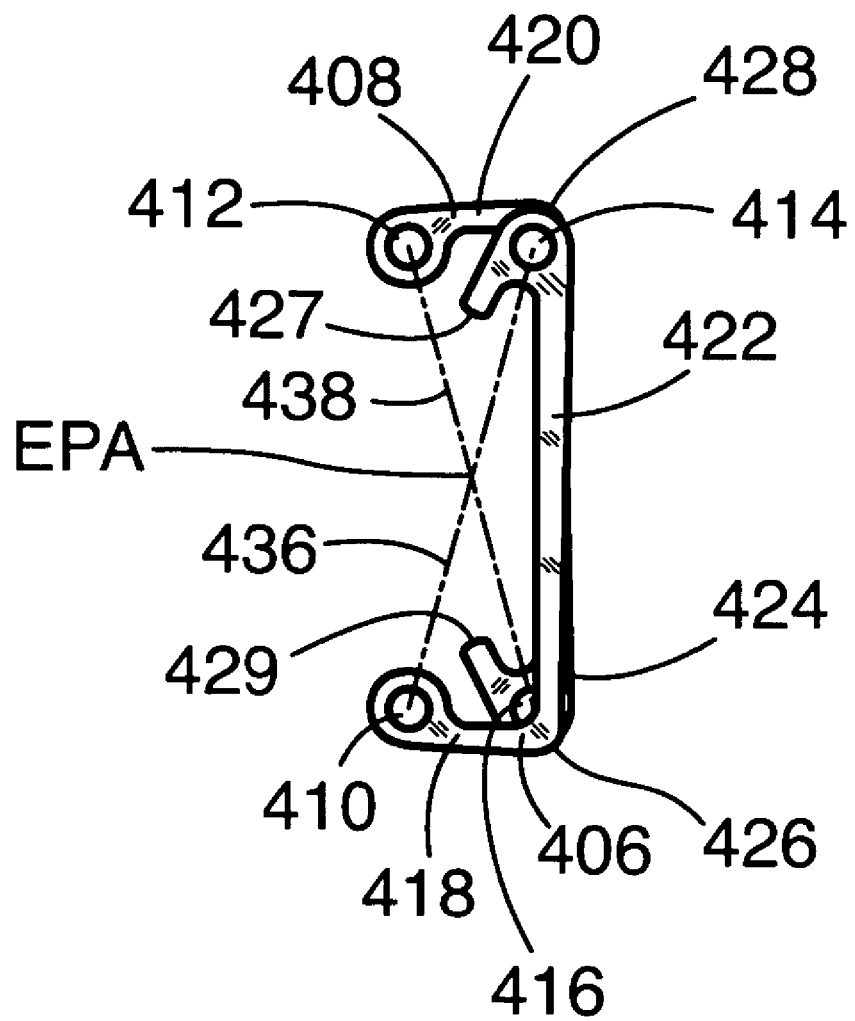
FIG. 15 is a side view illustrating the first hinge link and the second hinge link of FIG. 14 with additional portions of dual linkage hinge assembly removed for clarity.
Figure 16:
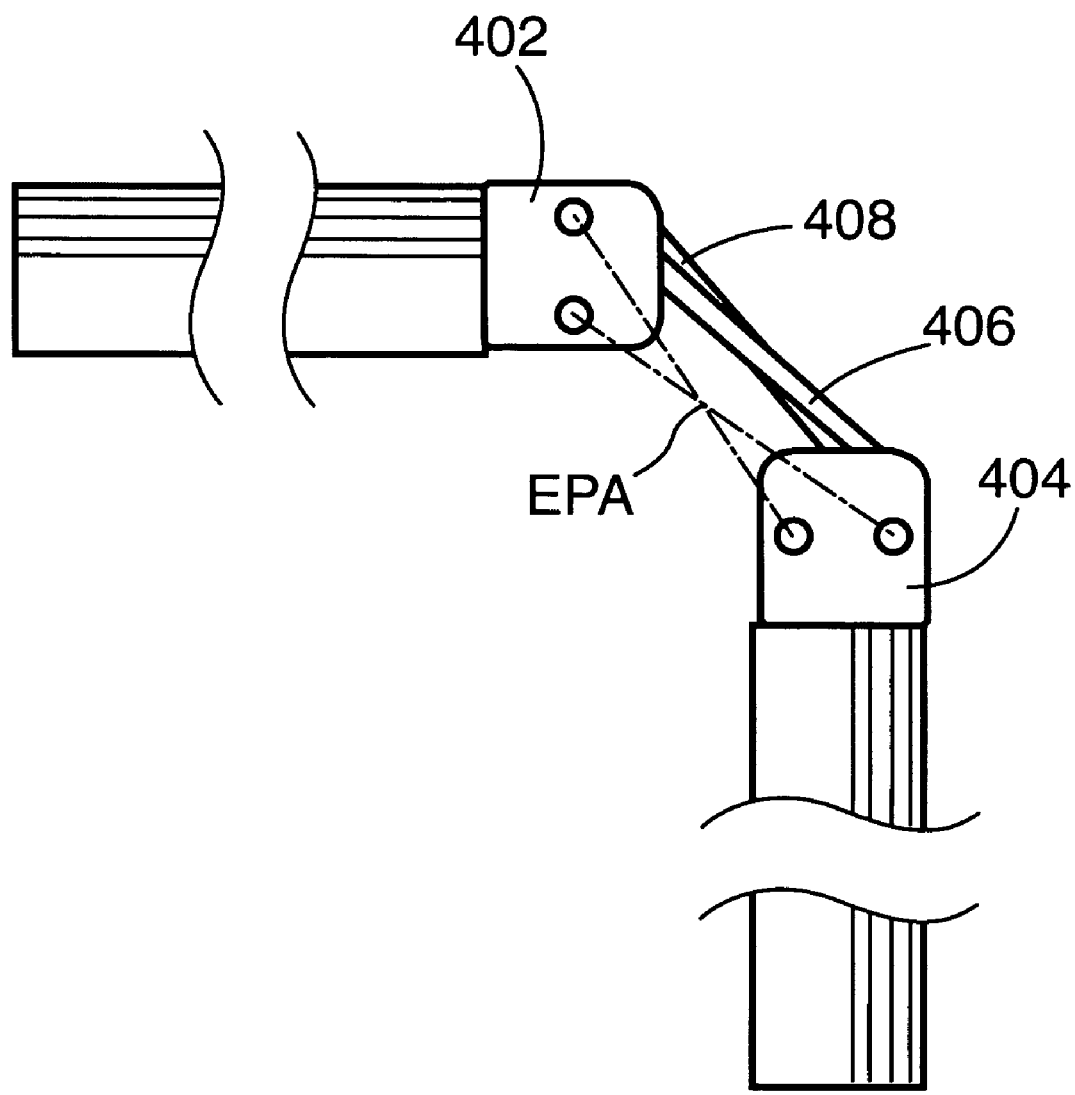
FIG. 16 is a side view illustrating the dual linkage hinge assembly coupled between adjacent tonneau sections in an intermediate position.
Figure 17:
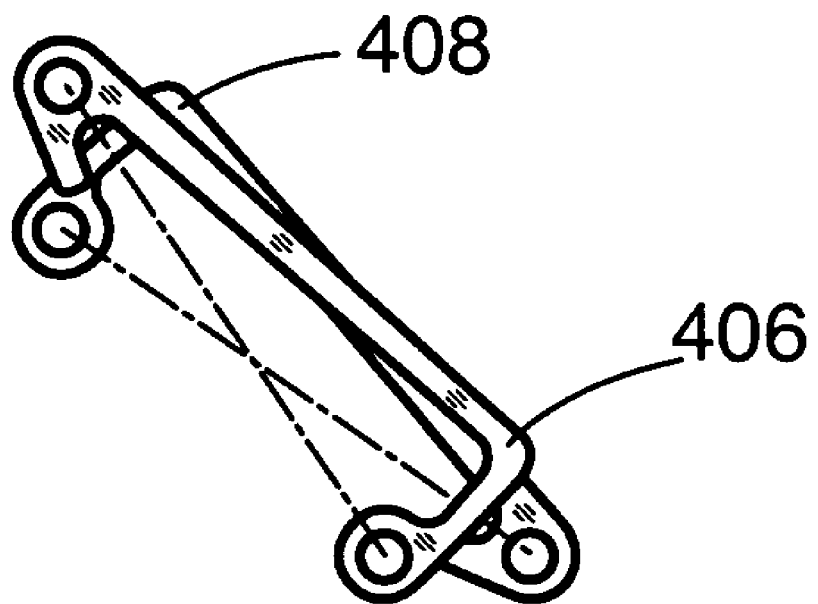
FIG. 17 is a side view illustrating the first hinge link and the second hinge link of FIG. 16 with additional portions of dual linkage hinge assembly removed for clarity.
Figure 18:
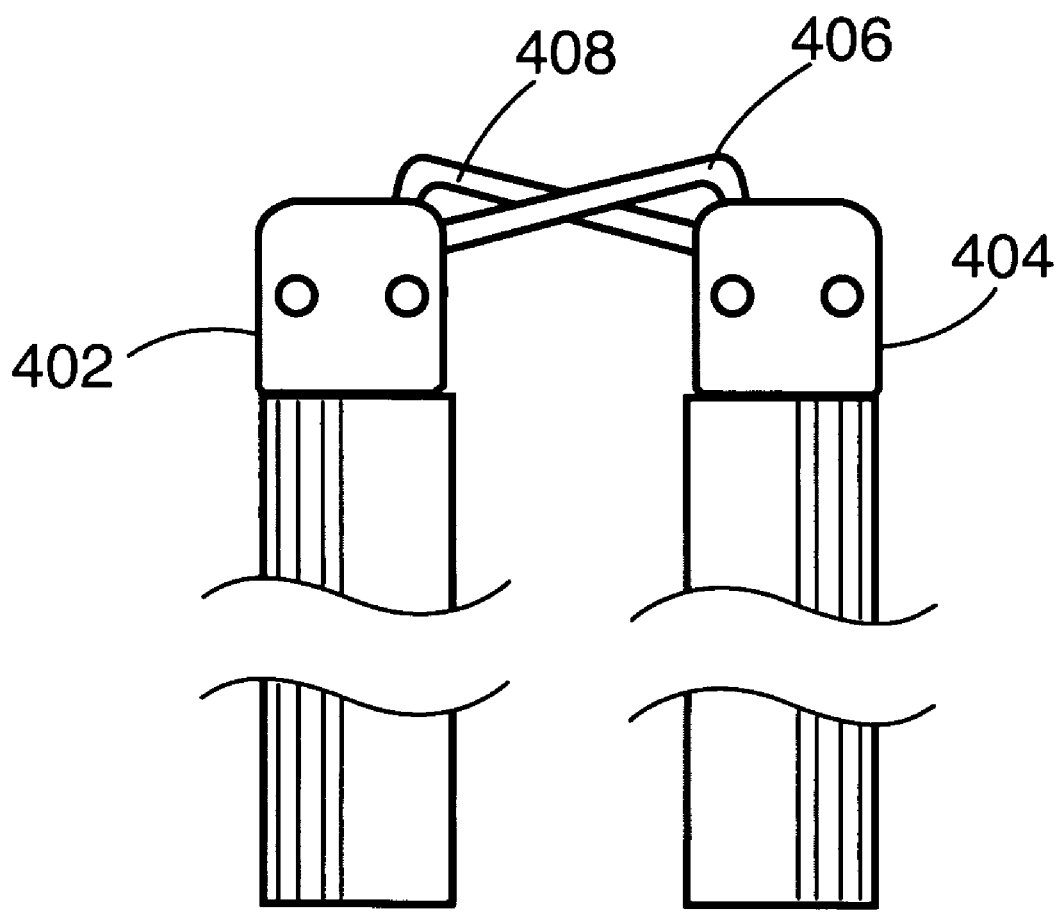
FIG. 18 is a side view illustrating the dual linkage hinge assembly coupled between adjacent tonneau sections in a folded position.
Figure 19:
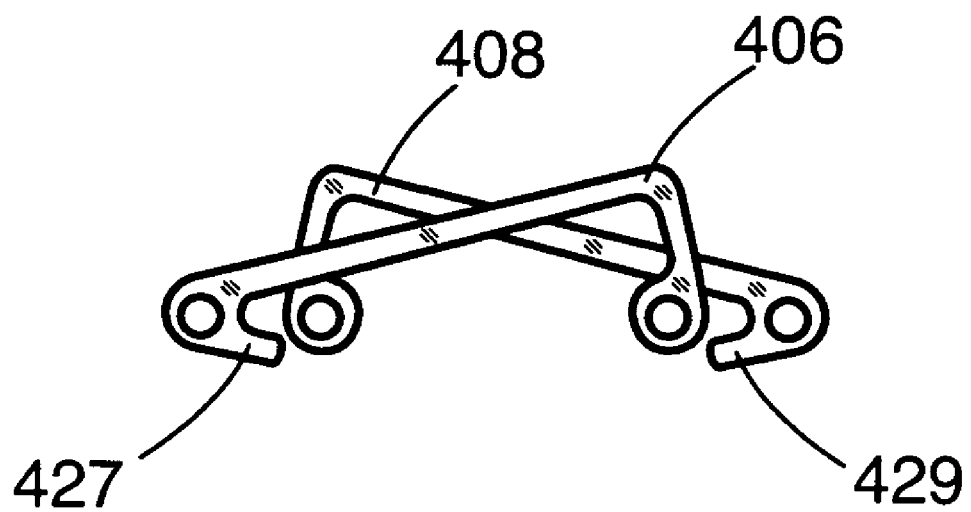
FIG. 19 is a side view illustrating the first hinge link and the second hinge link of FIG. 18 with additional portions of dual linkage hinge assembly removed for clarity.
Figure 20:
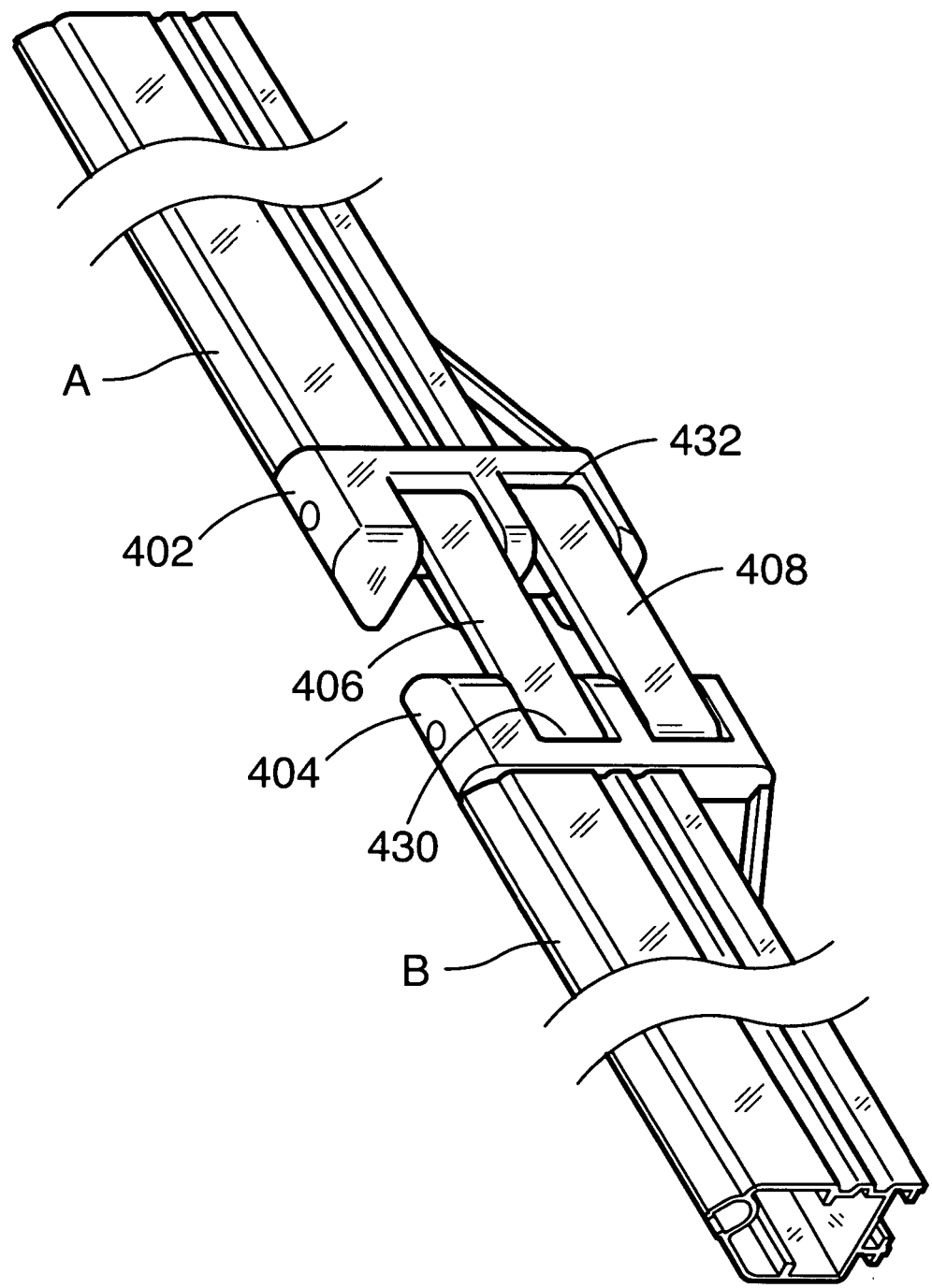
FIG. 20 is a perspective view illustrating the dual linkage hinge assembly coupled between adjacent tonneau sections in a flat position.
Figure 21:
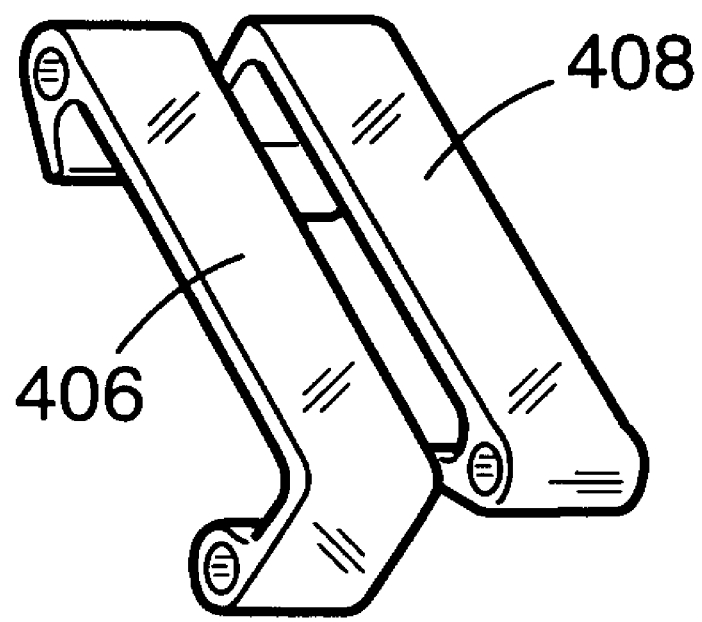
FIG. 21 is a perspective view illustrating the first hinge link and the second hinge link of FIG. 20 with additional portions of dual linkage hinge assembly removed for clarity.
Figure 22:
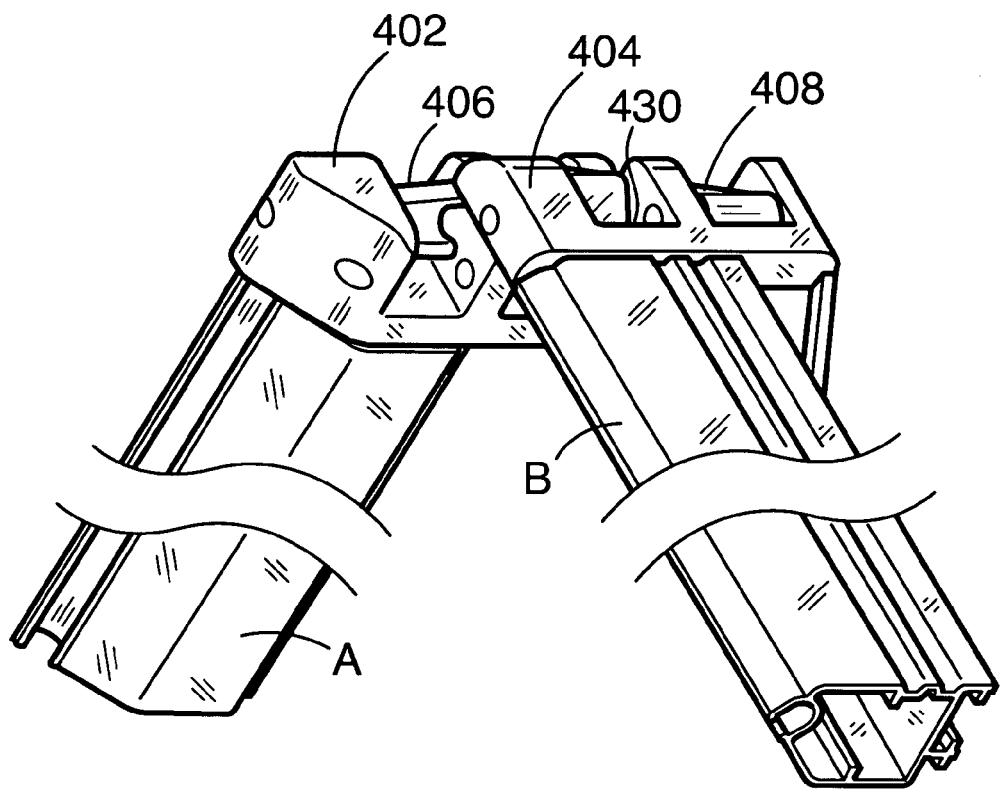
FIG. 22 is a perspective view illustrating the dual linkage hinge assembly coupled between adjacent tonneau sections in an intermediate position.
Figure 23:
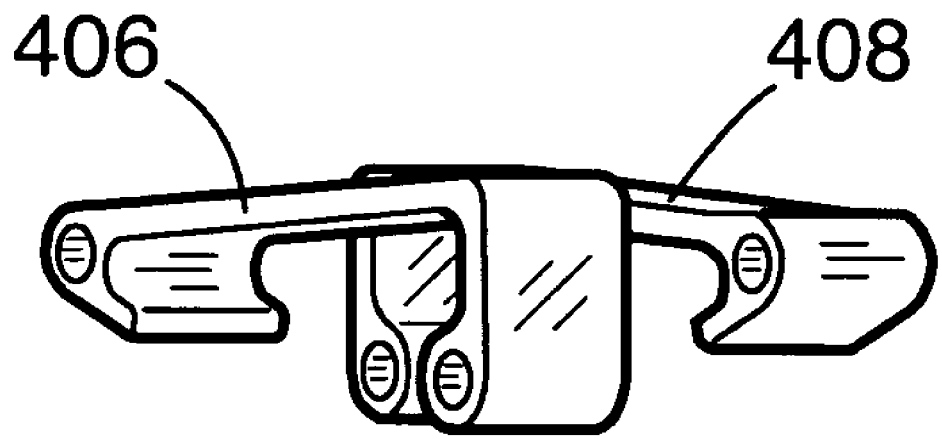
FIG. 23 is a perspective view illustrating the first hinge link and the second hinge link of FIG. 22 with additional portions of dual linkage hinge assembly removed for clarity.
Figure 24:
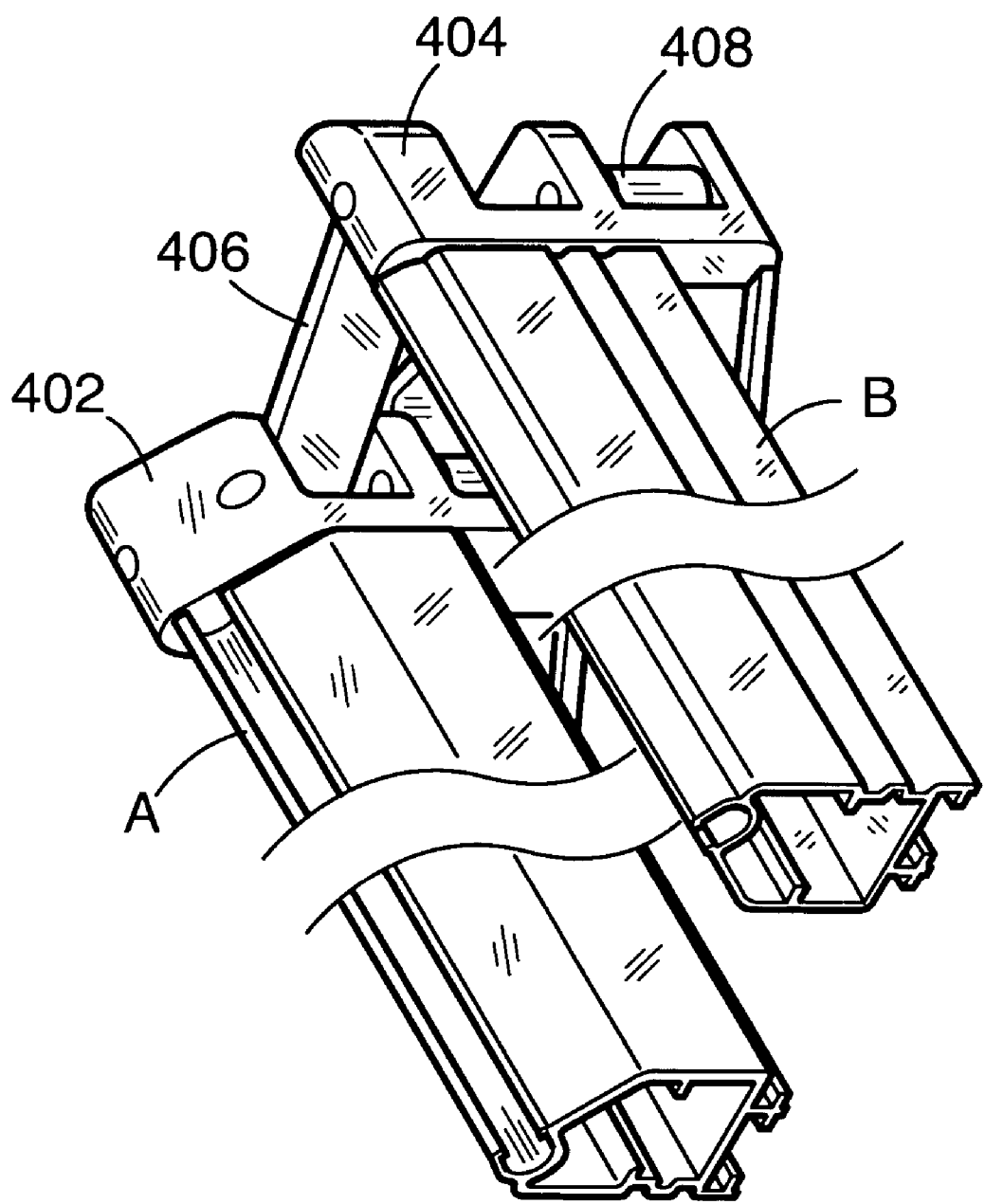
FIG. 24 is a perspective view illustrating the dual linkage hinge assembly coupled between adjacent tonneau sections in a folded position.
Figure 25:
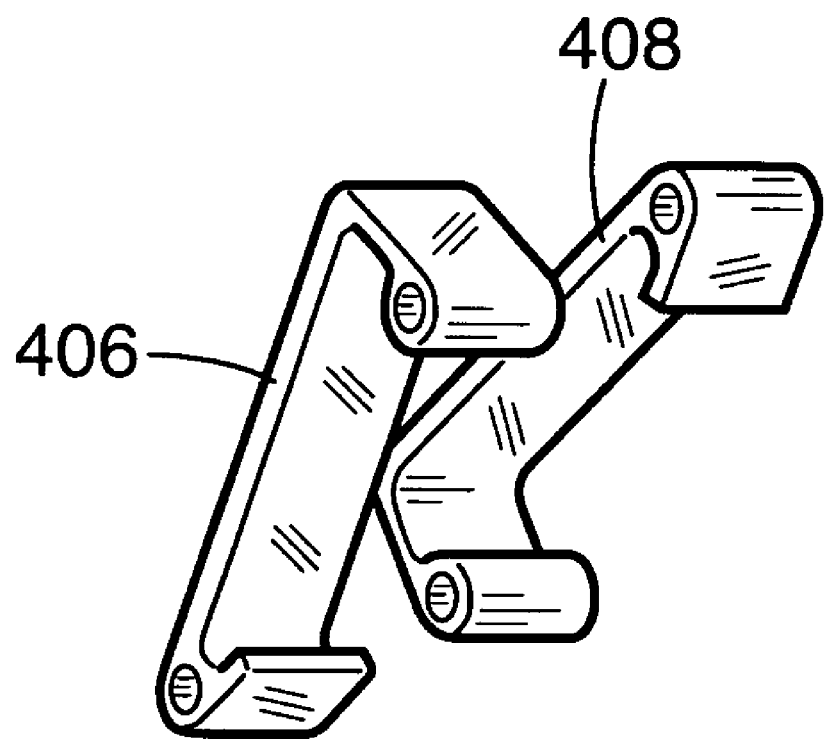
FIG. 25 is a perspective view illustrating the first hinge link and the second hinge link of FIG. 24 with additional portions of dual linkage hinge assembly removed for clarity.

With particular reference to FIGS. 14 and 15, dual linkage hinge assembly 400 includes a first hinge body 402, a second hinge body 404, a first hinge link 406, and a second hinge link 408. First hinge body 402 is fixedly coupled to one of side members 22, 34, 44 (hereinafter, side member A) and second hinge body 404 is fixedly coupled to adjacent one of side members 22, 34, 44 (hereinafter, side member B).

First hinge link 406 and second hinge link 408 are each generally L-shaped having a first pivot aperture 410, 412 and a second pivot aperture 414, 416, respectively. Each pivot aperture 410, 412, 414, 416 defines a pivot axis. It should be noted that first pivot aperture 410, 412 is positioned at an end of a base section 418, 420 of the L-shape and are offset inwardly such that first pivot aperture 410, 412 is generally tangent to base section 418, 420. Likewise, second pivot aperture 414, 416 is positioned at an end of a long section 422, 424 of the L-shape and are offset inwardly such that second pivot aperture 414, 416 is generally tangent to long section 422, 424. This offset positioning serves to define a smooth face surface generally planar with side members A and B (see FIG. 20) to ensure a smooth bottom surface of the side members and a proper sealing engagement along the top of sidewalls 108, 110. Furthermore, this arrangement serves to cause engagement of a stopper corner portion 426, 428 of the L-shape with a face 430, 432 (see FIGS. 20 and 22) to prevent undesired hyper- or over-rotation (i.e. greater than about 180 degrees between tonneau sections) of one tonneau section relative to an adjacent tonneau section. Similarly, extension leg 427, 429 are further provided to prevent undesired relative rotations beyond parallel in a collapsing movement (see FIGS. 18,19, 24, and 25) in that extension legs 427, 429 engage faces 430, 432 to prevent such movement.

First hinge link 406 and second hinge link 408 are each pivotally coupled between first hinge body 402 and second hinge body 404 in a mirrored relationship via coupling pins (not shown) extending through hinge link apertures 434 and pivot apertures 410, 412, 414, 416.

Each pair of hinge link apertures 434 are generally arranged to define a rectangular box configuration, generally referenced at Z (FIG. 14). The particular arrangement of first hinge link 406 and second hinge link 408 of dual linkage hinge assembly 400 further serves to define an "instant center" hinge. As seen in FIG. 15, this instant center hinge defines an overall effective pivot axis at the point where a first line 436 interconnecting first pivot aperture 410 to second pivot aperture 414 of first hinge link 406 intersects a second line 438 interconnecting first pivot aperture 412 to second pivot aperture 416 of second hinge link 408 (generally referenced as EPA). As can be seen in FIGS. 14–19, as one tonneau section pivots relative to the other tonneau section, the effective pivot axis prevents the tonneau sections from contact each other until the folding motion is complete, thereby minimizing the potential of damaging fabric cover 14 and ensuring repeatable opening and closing motions.

Fabric Cover Attachment

Figure 26:
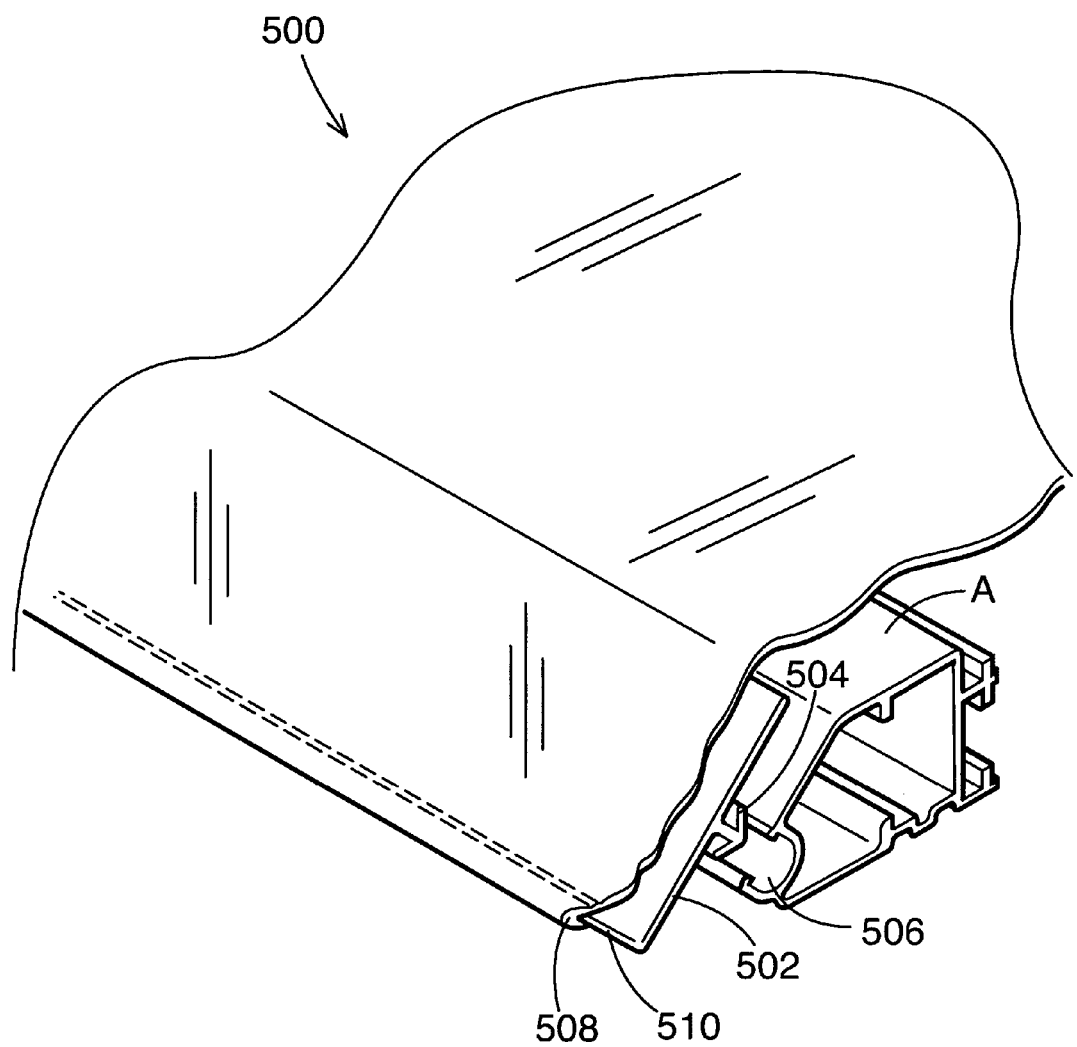
FIG. 26 is a perspective view illustrating a fabric cover attachment assembly to be installed in a side member.
Figure 27:
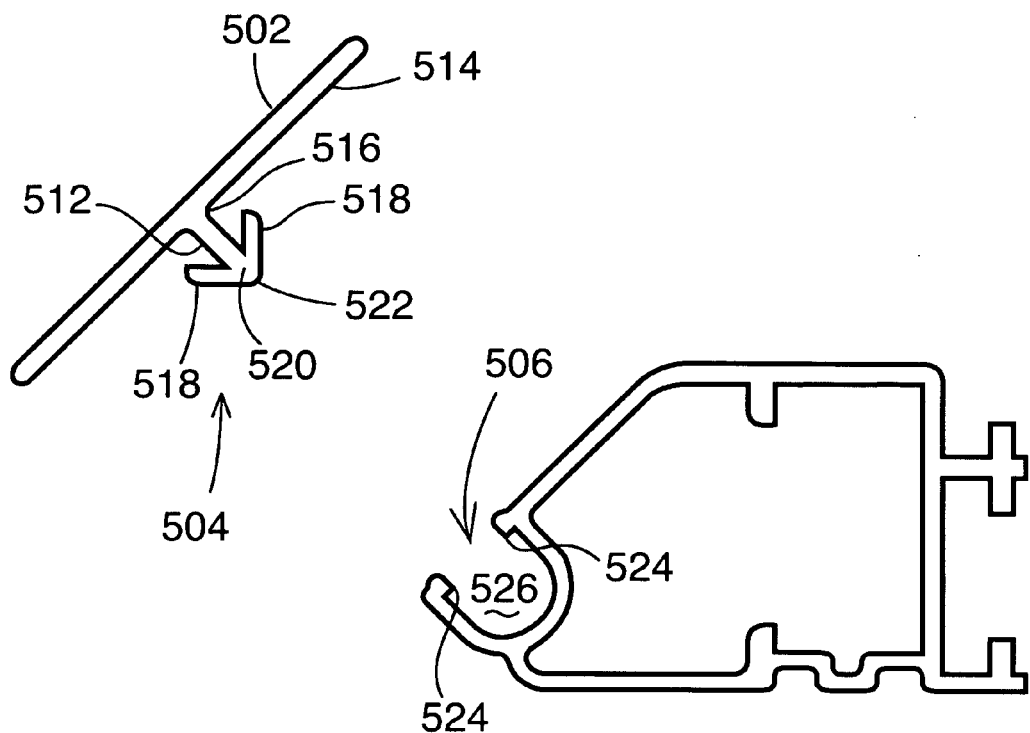
FIG. 27 is a side view illustrating the fabric cover attachment assembly to be installed in the side member with portions removed for clarity.
Figure 28:
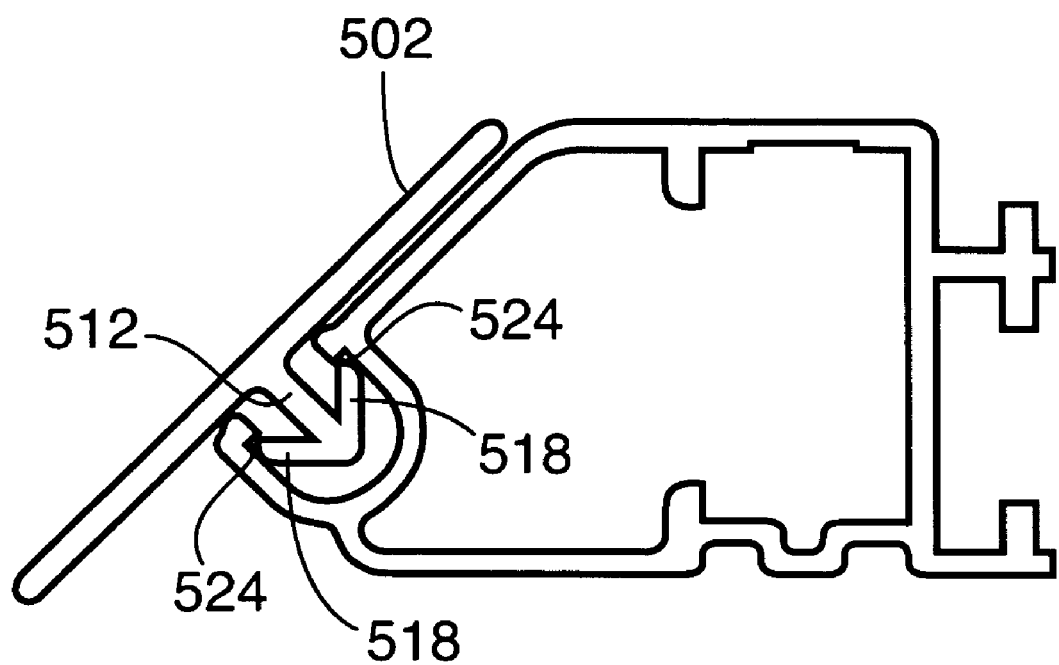
FIG. 28 is a side view illustrating the fabric cover attachment assembly installed in the side member with portions removed for clarity.

Referring now to FIGS. 26–28, a fabric cover attachment assembly 500 is illustrated. Fabric cover attachment assembly 500 includes an attachment plate 502 having an attachment feature 504 formed therein for engagement with a corresponding receiving feature 506 formed in side member 22, 34, 44, front rail member 20, rear rail member 32, and/or cross bow member 28, 40, 46. As seen in FIG. 26, fabric cover 14 is connectable to attachment plate 502 through any conventional process; however, it is preferably that fabric cover 14 includes a molded U-shaped runner member 508 engagable with an edge 510 of attachment plate 502. Runner member 508 may be sewn to attachment plate 502 or fastened according to other conventional methods.

As seen in FIGS. 27 and 28, attachment feature 504 is preferably formed to substantially resist disengagement from side member A. To this end, attachment feature 504 includes a central pin 512 extending generally orthogonally from an underside surface 514 of attachment plate 502 at a proximal end 516 thereof. A pair of elastic legs 518 are convergently connected to a distal end 520 of central pin 512 and are each angled upwardly to form a pointed tip 522. The pair of elastic legs 518 are sized to permit insertion of attachment feature 504 into receiving feature 506 while permitting some flexural movement of the pair of elastic legs 518 relative to gripping flanges 524 extending from a channel 526 of receiving feature 506. Once inserted, as seen in FIG. 28, elastic legs 518 expand to reliably engage gripping flanges 524 and retain attachment plate 502 and fabric cover 14 relative to side member A (or other rail member). It should be noted that attachment feature 504 can comprise a plurality of elastic legs 518 extending along central pin 512 to permit varying engagement locations and loading forces.

Figure 5:
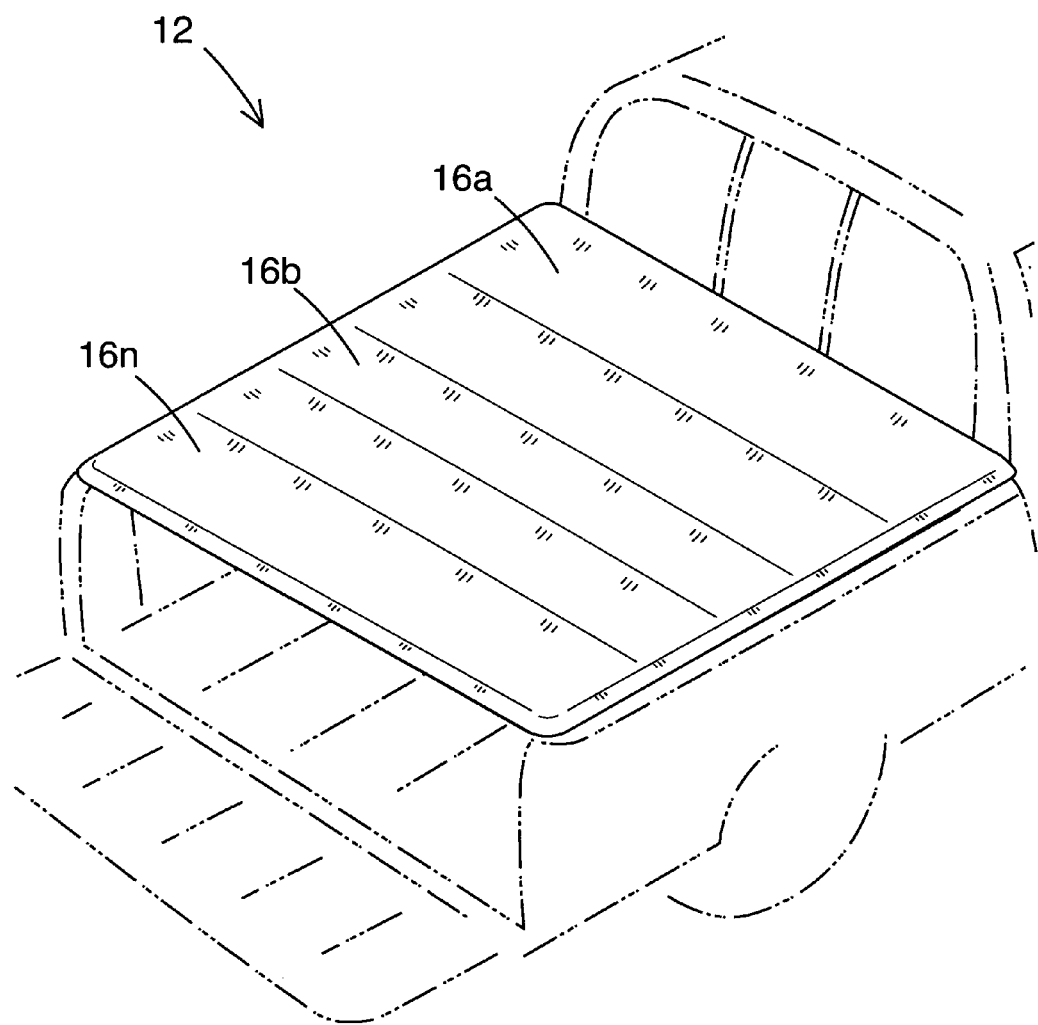
FIG. 5 is a perspective view illustrating the foldable tonneau cover with the rear tonneau section extended onto the cargo box of the pickup truck.
Figure 6:
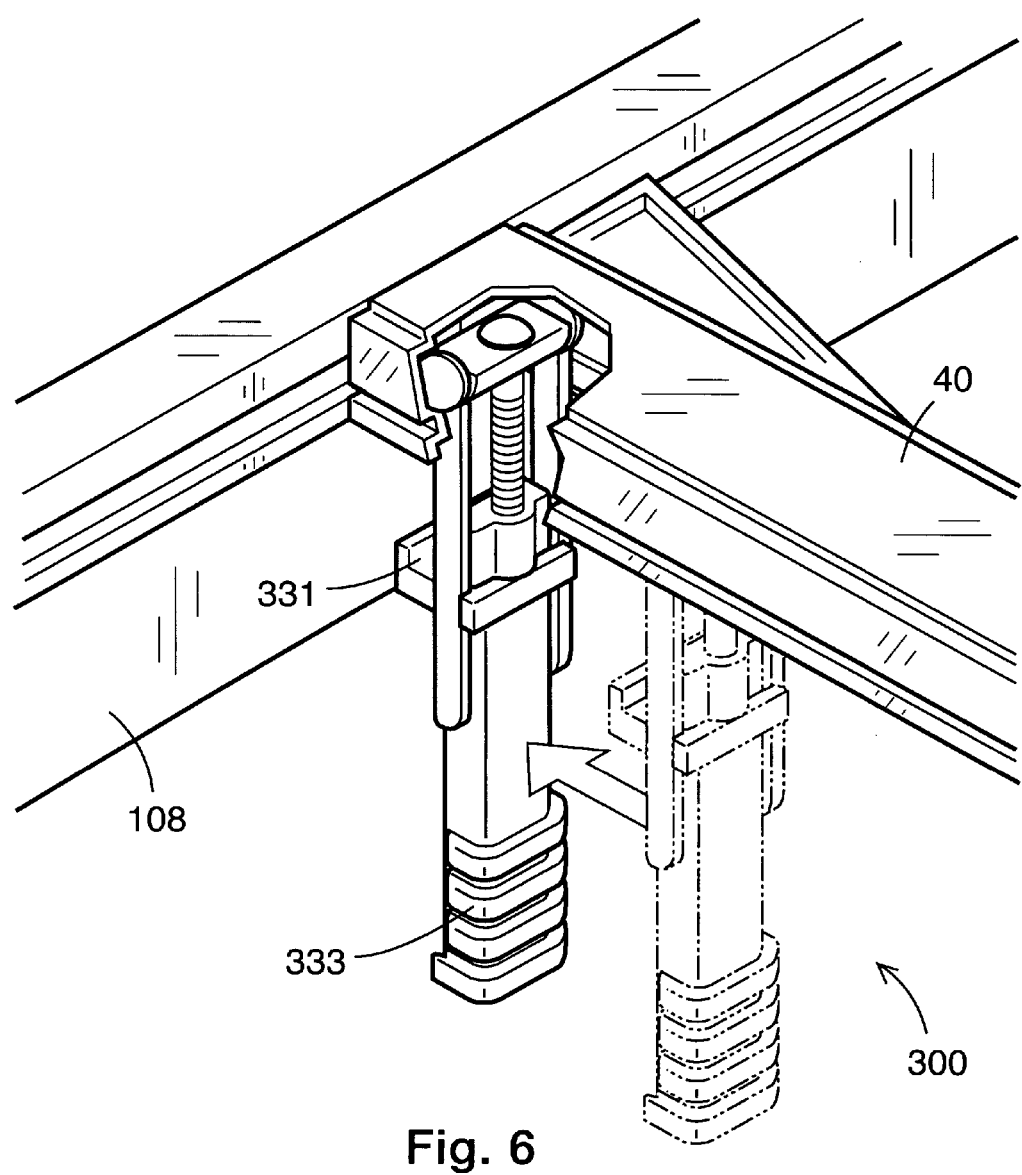
FIG. 6 is an enlarged perspective view illustrating the rear clamping system of the rear tonneau section of the present invention being spaced apart from the sidewall of the cargo box.
Figure 7:
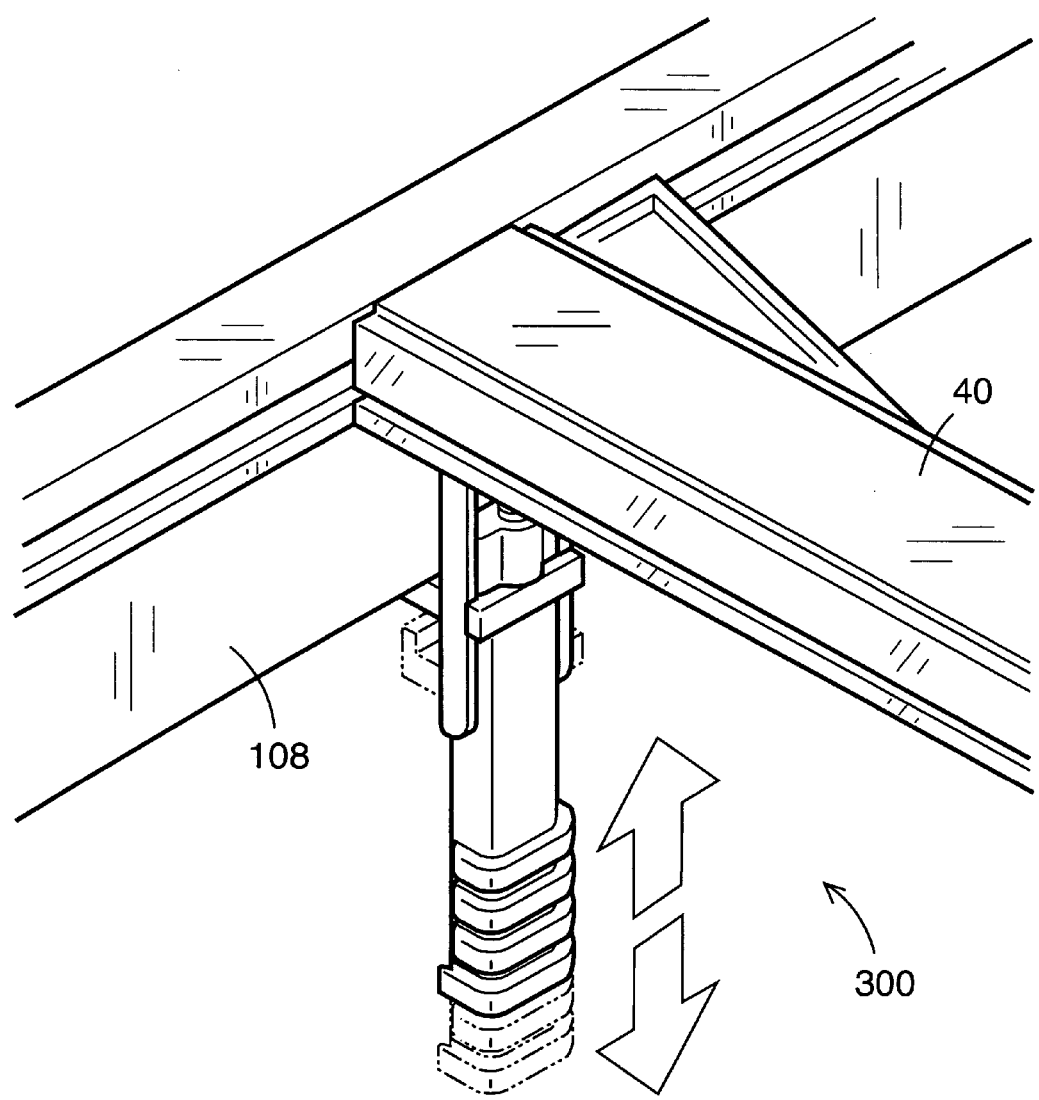
FIG. 7 is an enlarged perspective view illustrating the rear clamping system of the rear tonneau section of the present invention positioned adjacent to, yet extended from the sidewall of the cargo box.

With particular reference to FIGS. 1 and 5, fabric cover attachment assembly 500 is preferably formed substantially about the periphery of the internal framework of foldable tonneau system 12 and along each cross bow member 28, 40, 46. It should be appreciated that attachment feature 504 may be an elongated continuous member that extends substantial portions of the aforementioned segments or may be a series of individual fasteners depending upon the desired configuration. Either way, fabric cover attachment assembly 500 provides a substantial advantage over current attachment designs that require a rigid member to be slid within the side members from an end to capture the fabric cover—namely, fabric cover attachment assembly 500 enables the entire foldable tonneau system framework to be assembled and tested before fabric cover 14 is installed, thereby permitting much less cumbersome manufacturing.

Installation

Figure 3:
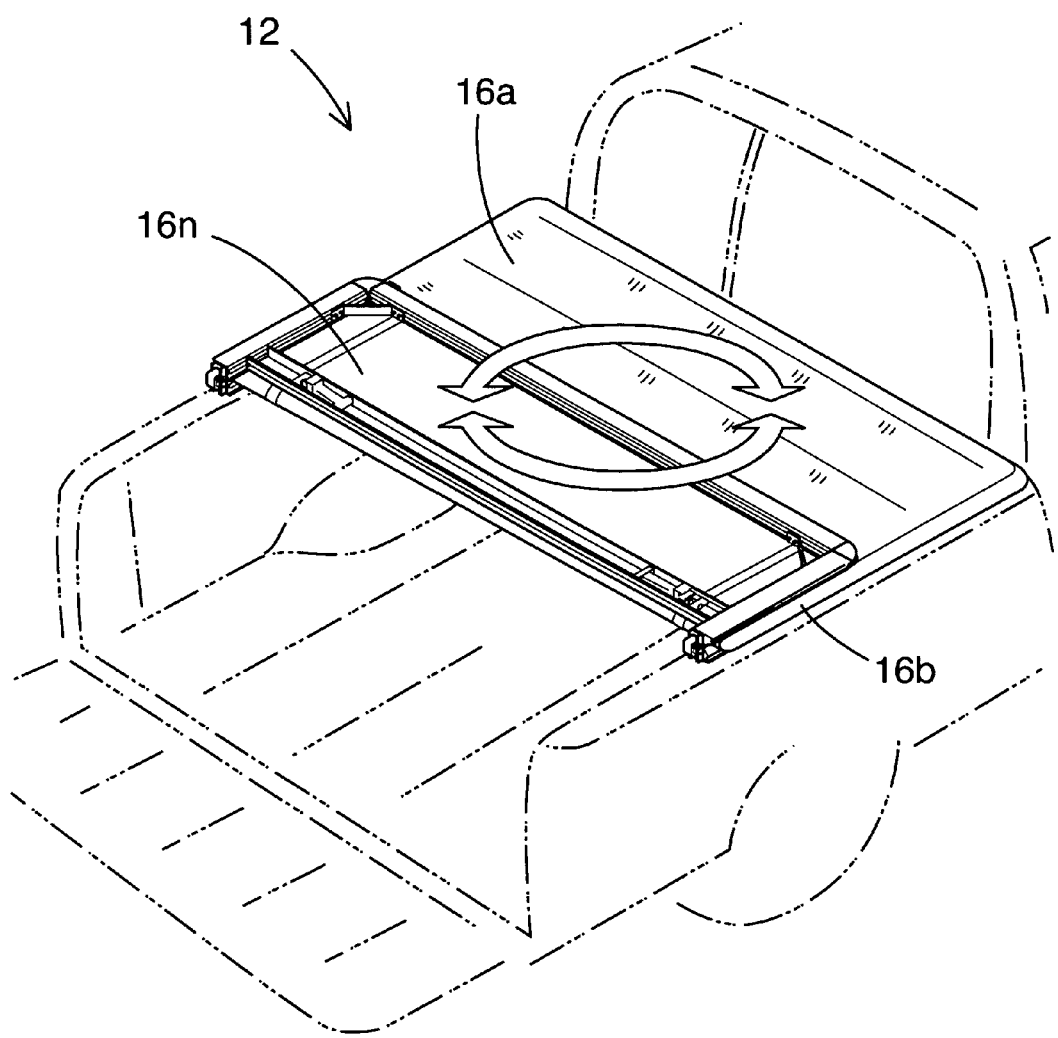
FIG. 3 is a perspective view illustrating the foldable tonneau cover with a rear tonneau section folded upon a middle tonneau section.

With particular reference to FIGS. 1–10, the installation of foldable tonneau system 12 on cargo box 102 of pickup truck 100 will now be described. As best seen in FIG. 2, a folded tonneau system 12 is first placed upon sidewalls 108, 110 of cargo box 102 such that side members 22 of front tonneau section 16a are equally positioned upon a top surface of sidewalls 108, 110. Restraining straps 602 (FIG. 10) are unlatched to permit the bundled group of middle tonneau section 16b and rear tonneau section 16n to be pivoted about the pair of dual linkage hinge assemblies 400 relative to front tonneau section 16a. As seen in FIG. 3, foldable tonneau system 12 is then adjusted to ensure proper positioning of foldable tonneau system 12 on cargo box 102. As seen in FIG. 4, front latch assemblies 200 are them slid to outboard positions adjacent a flange of sidewalls 108, 110 by sliding front trunnion 202 along cross bow member 28. Fastener 212 is then tightened such that engaging portion 208 of slidable catch 206 engages the flange of sidewalls 108, 110 to affect a reliable coupling.

As seen in FIG. 5, rear tonneau section 16n is then pivoted about the pair of dual linkage hinge assemblies 400' relative to middle tonneau section 16b to conceal cargo box 102. Rear latch assemblies 300 are them slid to outboard positions adjacent the flange of sidewalls 108,110 by sliding trunnion main body 306 along cross bow member 40. Slidable handle assembly 318 is then slid downwardly, against the biasing force of biasing member 322, and positioned to engage the flange of sidewalls 108, 110 and released such that biasing member 322 drives engaging portion 323 against the flange of sidewalls 108, 110 to affect a reliable coupling.

Figure 8:
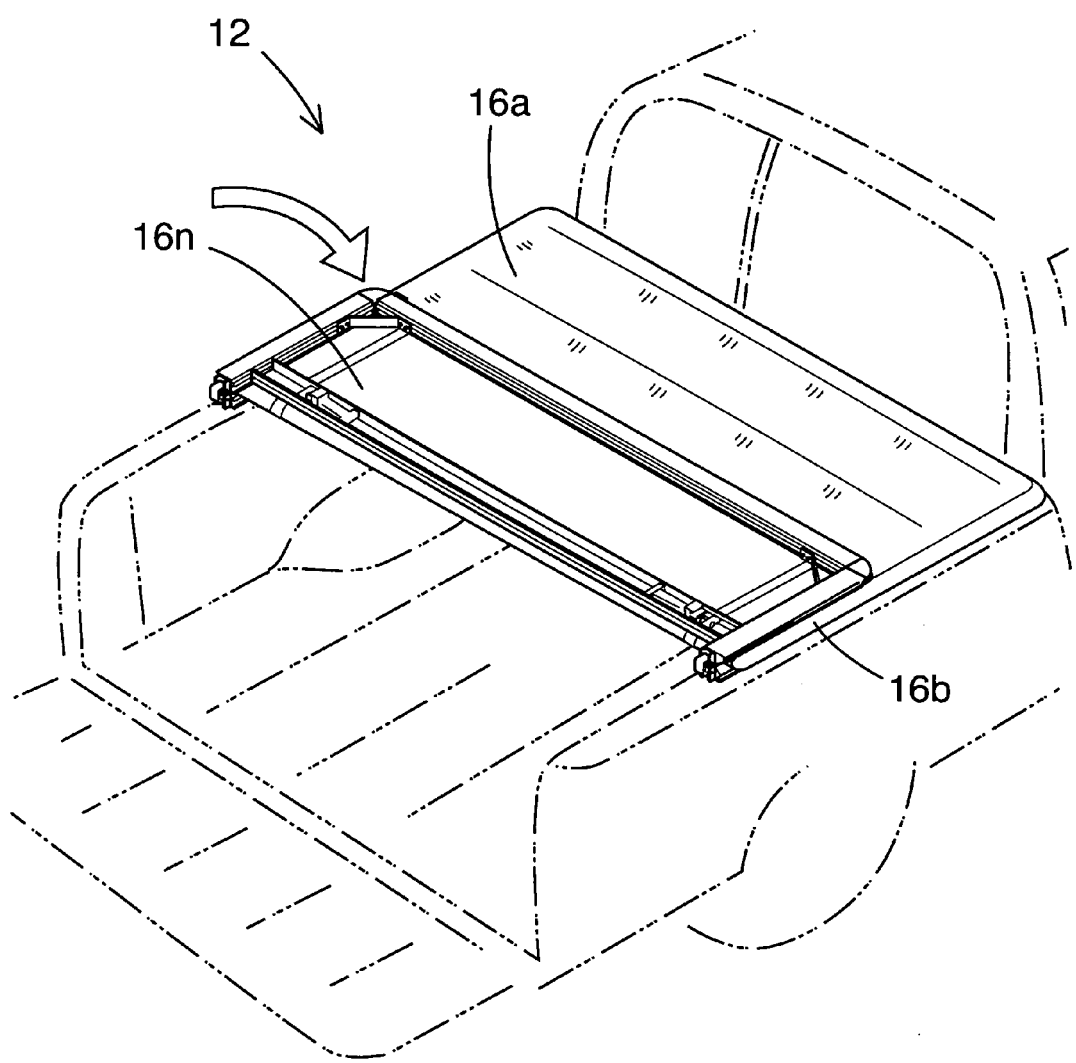
FIG. 8 is a perspective view illustrating the foldable tonneau cover with the rear tonneau section folded upon the middle tonneau section and the rear clamping system nested within a cross bow member.
Figure 10:
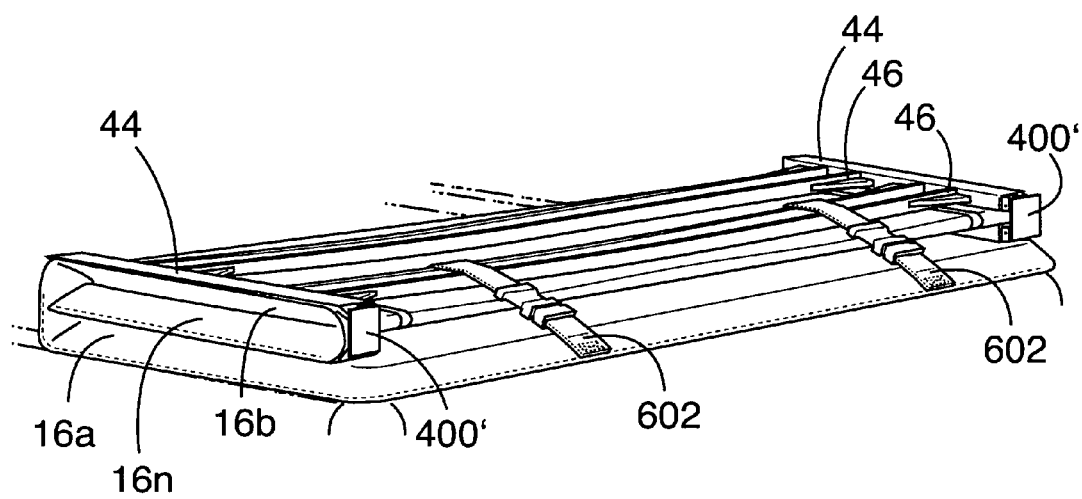
FIG. 10 is a front perspective view illustrating the foldable tonneau cover in the folded position with retaining clasps fastened.

Briefly, as illustrated in FIGS. 8–10, to fold foldable tonneau system 12, rear latch assemblies 300 are disengaged from sidewalls 108, 110 and slid inboard by sliding trunnion main body 306 along cross bow member 40. Slidable handle assembly 318 is then pivoted about trunnion main body 306 and into the nested position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tonneau system for a cargo box of a pickup truck, said tonneau system comprising:
    a framework having a cross bow member for supporting a cover, said framework being positionable generally over the cargo box of the pickup truck; and
    a latch assembly having:
        a first portion pivotally coupled to said cross bow member;
        a second portion slidably coupled to said first portion, said second portion having an engaging member operable to engage the cargo box of the pickup truck in a latched position; and
        a biasing member biasing said second portion into said latched position.

2. The tonneau system according to claim 1 wherein said latch assembly is positionable between an extended position and a nested position, said latch assembly having a locking clip extending from one of said first portion and said second portion for retaining said latch assembly in said nested position.

3. The tonneau system according to claim 2 wherein said locking clip comprises:
    a cantilever portion extending from said one of said first portion and said second portion; and
    an engaging portion formed on said cantilever portion, said engaging portion engaging said cross bow member when said latch assembly is in said nested position.

4. The tonneau system according to claim 3 wherein said cantilever portion and said engaging portion are integrally formed with said second portion of said latch assembly.

5. The tonneau system according to claim 1 wherein said second portion of said latch assembly includes a central bore, said biasing member being substantially disposed within said central bore.

6. The tonneau system according to claim 1 wherein said biasing member is selected from the group consisting essentially of a spring, a pneumatic member, a hydraulic member, an elastomeric member, and a bushing.

7. The tonneau system according to claim 1 wherein said first portion of said latch assembly is a trunnion assembly having a trunnion main body and a pair of trunnion ends disposed on opposing ends of said trunnion main body, said pair of trunnion ends being pivotally received in said cross bow member.

8. The tonneau system according to claim 1 wherein said first portion of said latch assembly is both pivotally and slidably coupled to said cross bow member.

9. The tonneau system according to claim 1, further comprising:
    a slot formed in one of said first portion and said second portion of said latch assembly; and
    a slide member extending from the other of said first portion and said second portion of said latch assembly, said slide member slidably engaging said slot to resist relative axial rotation between said first portion and said second portion.

10. The tonneau system according to claim 1 wherein said a first portion of said latch assembly is a trunnion assembly having a main trunnion body and a pair of slide members extending therefrom; and
    said second portion of said latch assembly is a handle assembly having a central bore, an engaging portion operable to engage the cargo box of the pickup truck in a latched position, and a pair of slots, said pair of slots sized to slidably receive said pair of slide members to resist relative axial rotation between said first portion and said second portion, said central bore being size to receive said biasing member substantially therein.

11. A tonneau system for a cargo box of a pickup truck, said tonneau system comprising:
a framework having a cross bow member for supporting a cover, said framework being positionable generally over the cargo box of the pickup truck; and
a latch assembly pivotally coupled to said cross bow member, said latch assembly being positionable in a latched position engagable with the cargo box of the pickup truck, an unlatched position disengagable with the cargo box of the pickup truck, and a nested position substantially retracted from said unlatched position and received within said cross bow member.

12. The tonneau system according to claim 11 wherein said latch assembly comprises:
a first portion pivotally coupled to said cross bow member;
a second portion slidably coupled to said first portion, said second portion having an engaging member operable to engage the cargo box of the pickup truck in a latched position, said second portion having a central bore; and
a biasing member biasing said second portion into said latched position, said biasing member being substantially received within said central bore.

13. The tonneau system according to claim 11, further comprising:
a locking clip extending from said latch assembly for retain said latch assembly in said nested position.

14. The tonneau system according to claim 13, wherein said locking clip comprises:
a cantilever portion extending from said one of said first portion and said second portion; and
an engaging portion formed on said cantilever portion, said engaging portion engaging said cross bow member when said latch assembly is in said nested position.

15. The tonneau system according to claim 14 wherein said cantilever portion and said engaging portion are integrally formed with said second portion of said latch assembly.

16. The tonneau system according to claim 11 wherein said biasing member is selected from the group consisting essentially of a spring, a pneumatic member, a hydraulic member, an elastomeric member, and a bushing.

17. The tonneau system according to claim 11 wherein said first portion of said latch assembly is a trunnion assembly having a trunnion main body and a pair of trunnion ends disposed on opposing ends of said trunnion main body, said pair of trunnion ends being pivotally received in said cross bow member.

18. The tonneau system according to claim 11 wherein said first portion of said latch assembly is both pivotally and slidably coupled to said cross bow member.

19. The tonneau system according to claim 11, further comprising:
a slot formed in one of said first portion and said second portion of said latch assembly; and
a slide member extending from the other of said first portion and said second portion of said latch assembly, said slide member slidably engaging said slot to resist relative axial rotation between said first portion and said second portion.

20. The tonneau system according to claim 11 wherein said a first portion of said latch assembly is a trunnion assembly having a main trunnion body and a pair of slide members extending therefrom; and
said second portion of said latch assembly is a handle assembly having a central bore, an engaging portion operable to engage the cargo box of the pickup truck in a latched position, and a pair of slots, said pair of slots sized to slidably receive said pair of slide members to resist relative axial rotation between said first portion and said second portion, said central bore being size to receive said biasing member substantially therein.

21. A tonneau system for a cargo box of a pickup truck, said tonneau system comprising:
a framework having a cross bow member for supporting a cover, said framework being positionable generally over the cargo box of the pickup truck; and
a latch assembly having:
a first portion pivotally coupled to said cross bow member;
a second portion slidably coupled to said first portion, said second portion having an engaging member operable to engage the cargo box of the pickup truck in a latched position; and
a biasing member biasing said second portion into said latched position, wherein
said latch assembly is positionable in a latched position engagable with the cargo box of the pickup truck, an unlatched position disengagable with the cargo box of the pickup truck, and a nested position substantially retracted from said unlatched position and received within said cross bow member.

22. The tonneau system according to claim 21, further comprising:
a locking clip for retaining said latch assembly in said nested position, said locking clip having a cantilever portion extending from said one of said first portion and said second portion, and an engaging portion formed on said cantilever portion, said engaging portion engaging said cross bow member when said latch assembly is in said nested position.

23. The tonneau system according to claim 21, further comprising:
a central bore disposed in said second portion of said latch assembly, said biasing member being substantially received within said central bore.

24. The tonneau system according to claim 21 wherein said biasing member is selected from the group consisting essentially of a spring, a pneumatic member, a hydraulic member, an elastomeric member, and a bushing.

25. The tonneau system according to claim 21 wherein said first portion of said latch assembly is a trunnion assembly having a trunnion main body and a pair of trunnion ends disposed on opposing ends of said trunnion main body, said pair of trunnion ends being pivotally received in said cross bow member.

26. The tonneau system according to claim 21 wherein said first portion of said latch assembly is both pivotally and slidably coupled to said cross bow member.

27. The tonneau system according to claim 21, further comprising:
a slot formed in one of said first portion and said second portion of said latch assembly; and
a slide member extending from the other of said first portion and said second portion of said latch assembly, said slide member slidably engaging said slot to resist relative axial rotation between said first portion and said second portion.

28. The tonneau system according to claim 21 wherein said a first portion of said latch assembly is a trunnion assembly having a main trunnion body and a pair of slide members extending therefrom; and said second portion of said latch assembly is a handle assembly having a central bore, an engaging portion operable to engage the cargo box of the pickup truck in a latched position, and a pair of slots, said pair of slots sized to slidably receive said pair of slide members to resist relative axial rotation between said first portion and said second portion, said central bore being size to receive said biasing member substantially therein.

* * * * *

UNITED STATES PATENT AND TRADEMARK OFFICE
CERTIFICATE OF CORRECTION

PATENT NO. : 7,188,888 B2  
APPLICATION NO. : 11/140754  
DATED : March 13, 2007  
INVENTOR(S) : Donald G. Wheatley and David M. Daley It is certified that error appears in the above-identified patent and that said Letters Patent is hereby corrected as shown below:

Column 1, line 27, "the" (1st occurrence) should be --they--.

Column 6, line 42, after "214" delete "are".

Column 7, line 47, at beginning of paragraph delete "59".

Column 10, line 40, "contact" should be --contacting--.

Column 10, line 53, "preferably" should be --preferable--.

Column 11, line 42, "them" should be --then--.

Column 11, line 51, "them" should be --then--.

Column 13, line 4, claim 10, "size" should be --sized--.

Column 13, line 32, claim 13, "retain" should be --retaining--.

Column 14, line 9, claim 20, "size" should be --sized--.

Column 16, line 4, claim 28, "size" should be --sized--.

Signed and Sealed this

Sixth Day of November, 2007

JON W. DUDAS  
*Director of the United States Patent and Trademark Office*